US009770653B2

(12) United States Patent
Hansson et al.

(10) Patent No.: US 9,770,653 B2
(45) Date of Patent: Sep. 26, 2017

(54) CONTROLLING A USER INTERFACE OF A COMPUTER DEVICE

(71) Applicant: KING.COM LIMITED, St. Julians (MT)

(72) Inventors: Magnus Hansson, Stockholm (SE); Tobias Nyblom, Stockholm (SE); Adam Axelsson, Stockholm (SE); Patrik Karlsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 111 days.

(21) Appl. No.: 14/662,537

(22) Filed: Mar. 19, 2015

(65) Prior Publication Data

US 2016/0220897 A1 Aug. 4, 2016

Related U.S. Application Data

(63) Continuation-in-part of application No. 14/611,733, filed on Feb. 2, 2015.

(51) Int. Cl.
*A63F 9/24* (2006.01)
*A63F 13/25* (2014.01)
*A63F 13/45* (2014.01)

(52) U.S. Cl.
CPC .............. *A63F 13/25* (2014.09); *A63F 13/45* (2014.09)

(58) Field of Classification Search
CPC ........................................................ A63F 9/00
See application file for complete search history.

(56) References Cited

U.S. PATENT DOCUMENTS

| 5,423,556 A | 6/1995 | Latypov et al. |
| 2002/0094854 A1 | 7/2002 | Morita et al. |
| 2014/0235306 A1 | 8/2014 | Walls et al. |

OTHER PUBLICATIONS

Askend. https://www.youtube.com/watch?v=JG75WbH5-yA.*
International Search Report, dated Apr. 21, 2016, and Written Opinion, issued in International Application No. PCT/EP2016/051961.
CrazyMikesapps, "Azkend 2 HD—The World Beneath iPhone App Review—CrazyMikespps", https://www.youtube.com/watch?v=yWFBH3S6tG8, Created Mar. 15, 2012.

* cited by examiner

*Primary Examiner* — Reginald Renwick
(74) *Attorney, Agent, or Firm* — Saul Ewing LLP

(57) ABSTRACT

A computer device having a user interface configured to display user actuatable game elements in a game board and to detect user input when a user engages with a game element in a move; a processor configured to receive a detected user input and on detecting a match game condition of multiple tiles in a first direction to control the user interface to remove at least three game elements from the display and to generate replacement user game elements for a subsequent move; and a graphics rendering component operable to render the game elements on the user interface, each game element having a graphical representation on a tile having a background appearance.

19 Claims, 38 Drawing Sheets

CONTROLLING A USER INTERFACE OF A COMPUTER DEVICE

CROSS-REFERENCE TO RELATED APPLICATIONS

This application is a Continuation-in-Part from U.S. application Ser. No. 14/611,733, filed Feb. 2, 2015, the contents of which are herein fully incorporated by reference.

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

SUMMARY OF THE INVENTION

Aspects of the present invention provide improved methods of controlling a user interface in the context of a computer-implemented switcher game. They provide a solution to the technical problem of improved user engagement by providing a new user engagement mode, which is implemented by a processor and data structure in a computer device.

One aspect of the invention provides a computer device having: a user interface configured to display user actuatable game elements in a game board and to detect user input when a user engages with a game element in a move; a processor configured to receive a detected user input and on detecting a match game condition of multiple tiles in a first direction to control the user interface to remove at least three game elements from the display and to generate replacement user game elements for a subsequent move; and a graphics rendering component operable to render the game elements on the user interface, each game element having a graphical representation on a tile having a background appearance, wherein the processor is configured to determine on detecting the match game condition if at least one tile in the match game condition has an attained background appearance and if so to apply the attained background appearance to each tile of the match condition, and further configured on detecting a match game condition of a predetermined type to extend the attained background appearance to at least one further tile adjacent each tile of the match condition in a second direction different to the first direction.

The attained background appearance can be extended to at least two further tiles adjacent opposite edges of each tile of the match condition. In this way, in the case that the at least one further tile demonstrates a visual effect of a wavefront, the wave appears to be moving both upwards and downwards on the screen, or both to the right and the left. In this context, the reference to "at least two further tiles" indicates that there is at least one further tile adjacent one edge of each tile of the match condition, and at least one other further tile adjacent the other edge of each tile of the match condition.

An attained background appearance can be applied by rendering tiles at the location of the removed game elements with the background appearance when the removed game elements are replaced. It will be understood that each tile has a game board location, but game elements are removed and replaced over the tiles. The background appearance is the appearance of a static tile underlying the game element or game object which may change. A background appearance may cover the whole tile or only a part thereof.

The graphics rendering component is operable to initially render at least some game elements on the user interface with a tile having a standard background appearance, wherein the standard background appearance differs visually from the attained background appearance.

In the described embodiment, the standard background appearance represents land and the attained background appearance represents water. The at least one further tile can additionally demonstrate a visual effect of a wavefront. The wavefront may be rendered in moving animation so as to have the effect of moving the attained background appearance over the at least one further tile in the second direction, until the at least one further tile has completely attained the new background appearance of water. In the game play, if the processor determines on detecting the match game condition that no tile in the match game condition has an attained background appearance, it is configured to apply the standard background appearance to replacement tiles of the game elements.

In most games, the graphics rendering component is operable to render game elements in multiple varieties, each variety differing from another variety in its shape and/or colour of a game object rendered on each tile.

For example, the game elements may resemble sea based creatures.

The processor may be configured to control the graphics rendering component to generate on the game board at least one special game element, wherein a special game element causes multiple further game elements to be removed when it is involved in a match game condition.

The tiles on the game board can be arranged in rows and columns. There are many different types of match condition, for example, as known in the game which is available under the trade name Candy Crush. One predetermined type of match game condition is that game elements on four sequentially adjacent tiles match. Sequentially means that the tiles are adjacent one another in a sequence in the first or second direction, for example, a row of four adjacent tiles or a column of four adjacent tiles. Another predetermined type of match game condition is a condition in which the game elements on at least three tiles in a first direction and at least three tiles in a second direction match, wherein one of the at least three tiles in the first direction is in common with one of the at least three tiles in the second direction. These are referred to as a T match or an L match.

When the attained background appearance extends to the at least one further element, it can cause existing game elements on the at least one further tile to be removed as in a line blast feature.

In one version of a match 3 switcher game, the direction of refill of the game element is downwards from a top portion of the game board when viewed by a user.

In another version of a match 3 switcher game, wherein each tile has a selectable physics which controls the direction in which it moves to replenish a vacancy left by removed game elements.

In one game objective the processor is configured to detect when all tiles have the attained background appearance, and to generate a new game board for a new level. In another game objective, the objective may be to cover only a predetermined set of tiles with the attained background appearance.

The invention provides in another aspect a game element is engaged by a user to be switched with an adjacent game element to create a match.

The method can comprise the step of initially generating a game board with a first set of tiles having a standard background appearance and a second set of tiles having the attained background appearance, and a game objective may be for a user to achieve a game board where all tiles have the attained background appearance.

The method can comprise the step of generating a game board having a first set of tiles with a standard background appearance, a second set of tiles with a first attained background appearance and a third set of tiles with a second attained background appearance, wherein an objective for the user is to select one of the first and second attained background appearances and to control the game elements such that after at least one game move the replacement tiles are of his selected first or second attained background appearance.

A further aspect provides computer program products for implementing the afore-defined methods.

DESCRIPTION OF THE DRAWINGS

Embodiments of the invention will now be described by way of the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
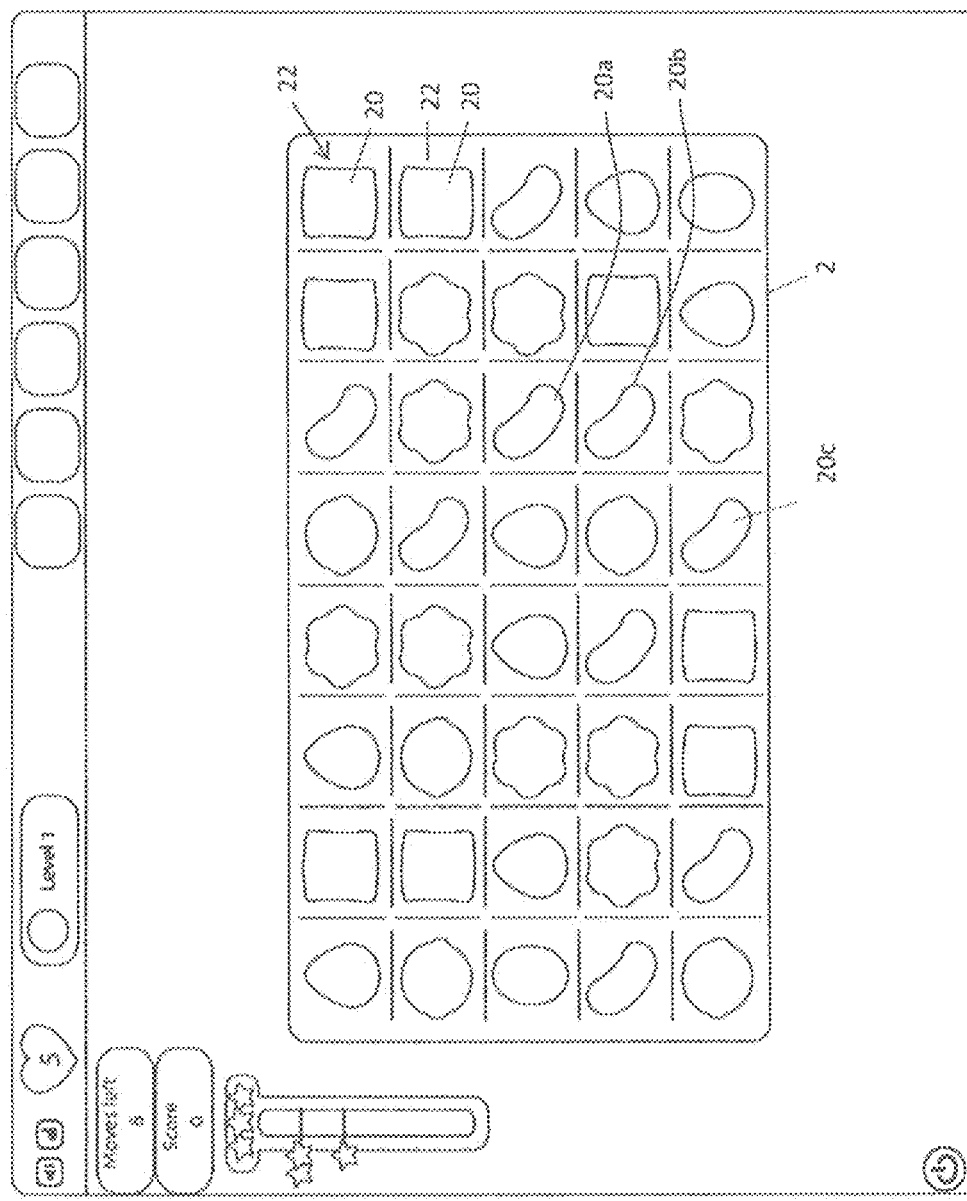
FIG. 1 is a schematic diagram of a game board of an existing version of a match three game.

FIG. 1 shows a display of a known version of a match 3 switcher game called Candy Crush Saga™. FIG. 1 illustrates a game board 2 with a plurality of game elements 20. The game elements are each of six different shapes and colours. Each game element is supported by a tile 22. The tiles are not readily visible to a player of the game—the game elements are the main focus for a player. However, the tiles govern characteristics of the game elements which are visible to a player as will be described in more detail later.

Figure 2:
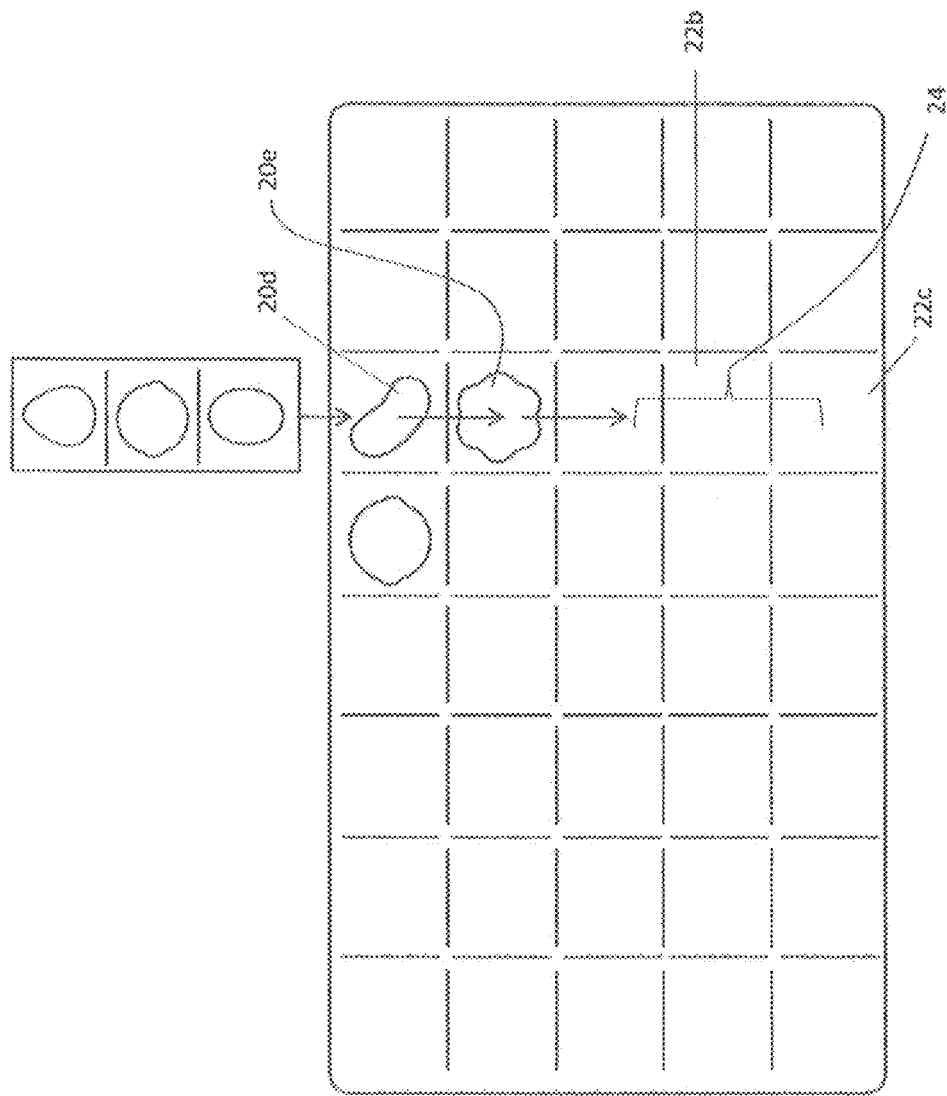
FIG. 2 is a schematic diagram illustrating how a game board is repopulated with replacement game elements.
Figure 3:
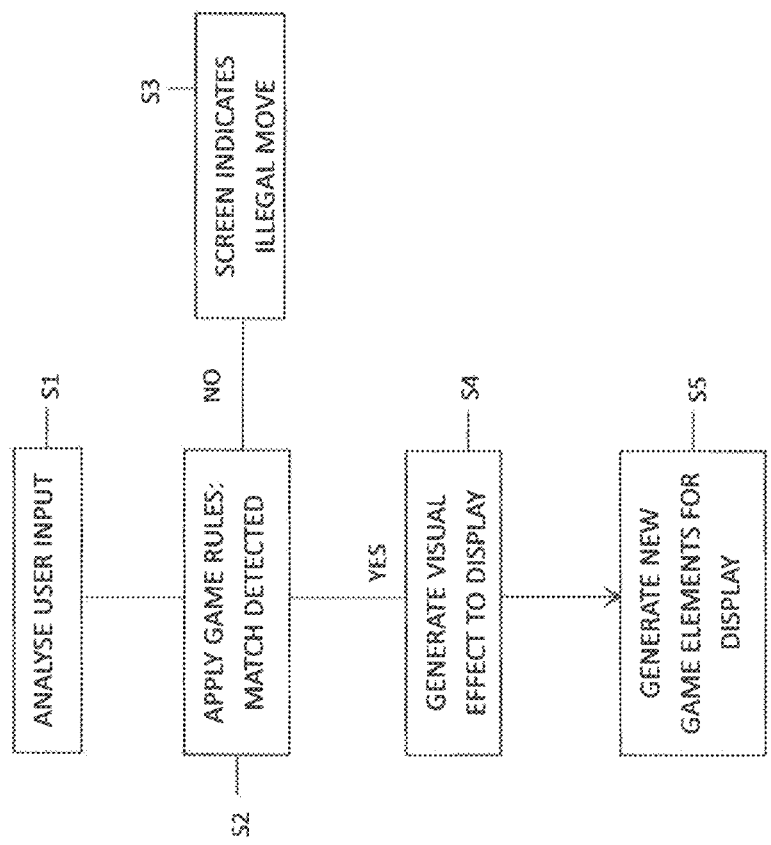
FIG. 3 is a flow chart indicating how a game board is repopulated with replacement game elements.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1 that game element 20c is moved one place to the right to form a three-line match with game elements 20a and 20b. Turning now to FIG. 2, this has the effect of game board elements 20*a*, 20*b* and 20*c* "disappearing", creating a visual effect (animation) on the screen to indicate the disappearance, such as a minimal explosion effect denoted 24 in FIG. 2. The two game elements which were directly above game elements 20*a* will now fall downwards into the spaces created by the removal of game elements 20*a*, 20*b* and 20*c*. Thus, game element 20*e* will end up at the location of tile 22*c*, and game element 20*d* will end up at the location of tile 22*b*. In addition, three new tiles with game elements are "created" and fall downwards into the game board to fill the remaining three spaces above tile 22*b*. The game elements on the newly created tiles which fall downwards into the game board are generated at random. The user then has a new game board on which to play a subsequent move. FIG. 3 is a flow chart illustrating a process implemented by software in a processor for executing the basic game mechanic just discussed. At step Si the input made by a player on the screen is analysed. At step S2 the game rules are applied to see whether or not at least a three-element match has been created. If it has not, at step S3, the screen indicates an illegal move to a user, and the player must try again. If a match has been detected, at step S4 an appropriate visual effect is generated for the display to denote the match and the disappearance of the game elements which have been matched. At step S5, new game elements are generated for the display, these game elements falling downwards to fill up the display from the top. The so-called physics of the tile on generation of a new game board after each move is always the same in the existing version of the game called Candy Crush. That is, tiles drop down from above the game board at a set speeds and from the top of the game board.

In an alternative version detailed in U.S. Ser. No. 14/316,274 and launched under the name Candy Crush Soda, the tile physics can vary so that the speed and direction of replacement can alter.

According to described embodiments the present invention, a new game utilising a new mode is provided, with a completely new game objective and providing improved user engagement. According to this game mode, an initial game board is delivered with game elements having a tile with a standard background appearance, and one or more game elements having an "attained" background appearance. Although a game board is initially delivered with at least one tile with an "attained" background appearance, this term is used because the objective of game is to change the background appearance from a standard background appearance to be "attained" background appearance by making game moves.

In the new game described later, entitled "Beached Buddies", the standard background appearance has a visual effect as sand (for example, it is brown and could also be rendered to visually represent the grain form of sand) or any other ground, and the attained background appearance has the visual effect of water.

According to the new game mode, the aim is to achieve an entire game board of tiles with the attained background appearance. Additionally, the new game offers a new visual experience by generating a "tidal wave" when certain game objects and background combinations are detected.

This new game mode is supported by a processor executing decision logic to alter the background appearance of tiles in replacement game elements, and a data structure which supports the logic.

Figure 4:
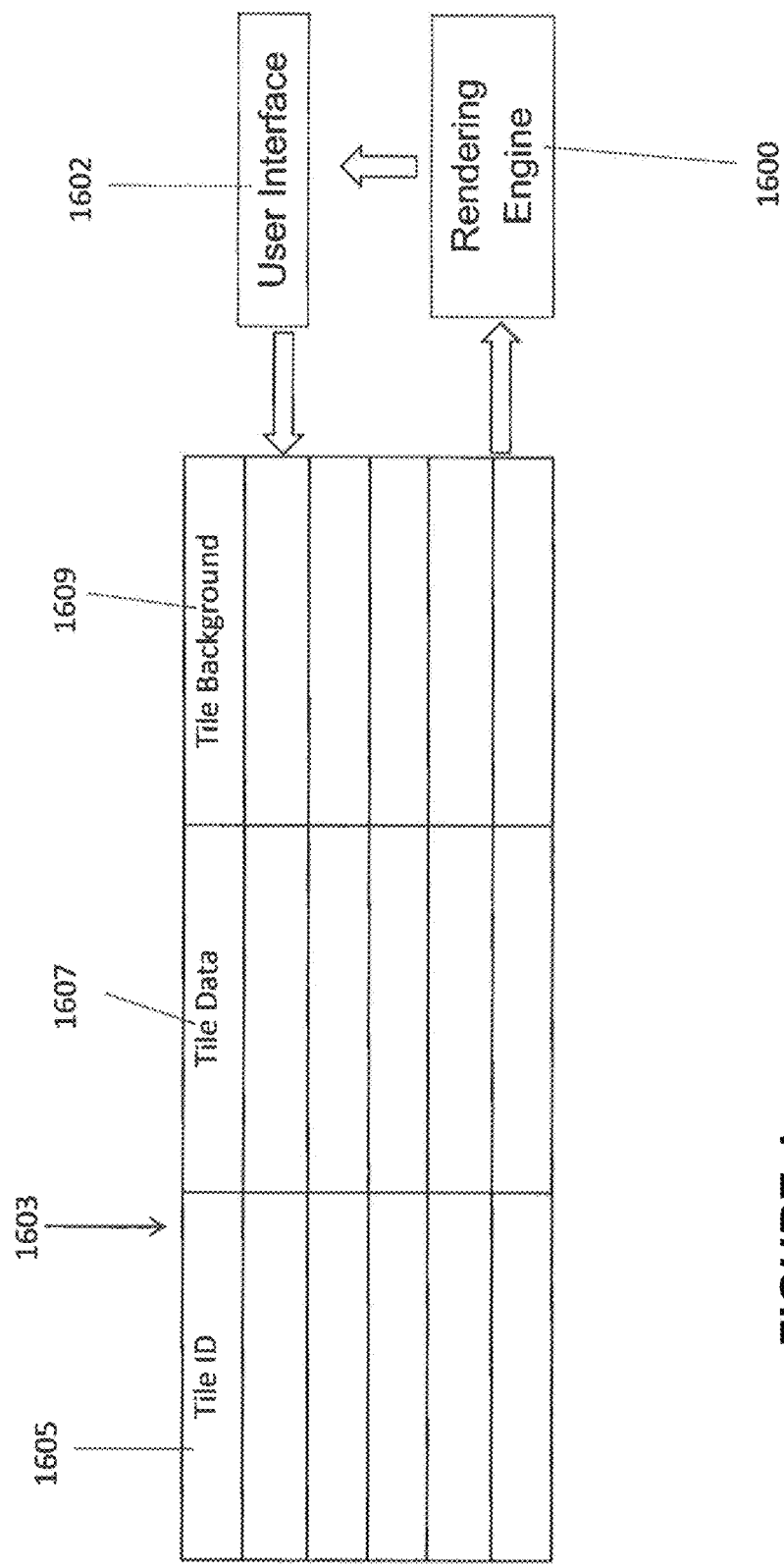
FIG. 4 is a diagram of a data structure for managing the tile background, showing the interrelation between the data structure and a rendering engine of the graphics controller.
Figure 5:
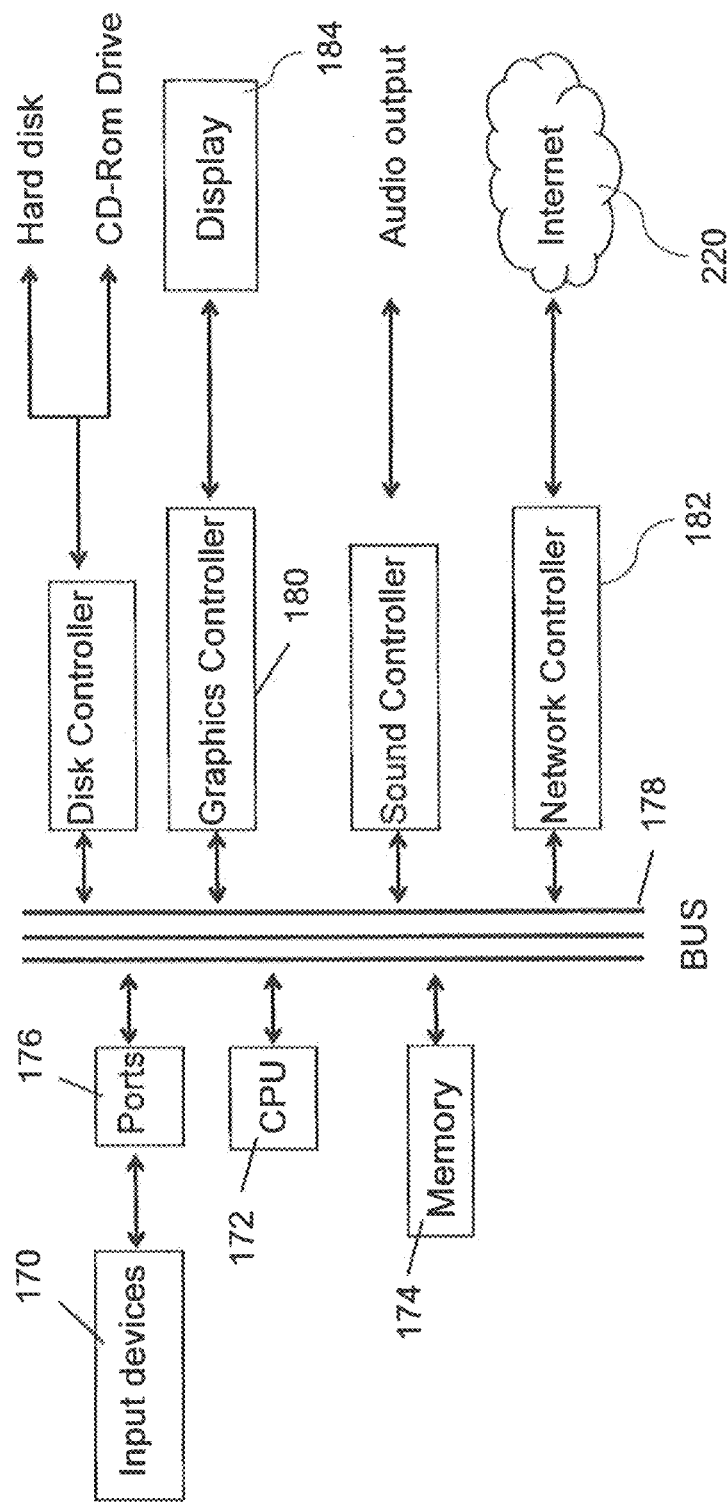
FIG. 5 is a schematic diagram of a computer device.

FIG. 4 illustrates a data structure for managing the tile background appearance, and schematically illustrates the interrelation between the data structure 1603 and a rendering engine 1600 of the graphics controller 180. The graphics controller 180 is illustrated in FIG. 5. The data structure 1603 can be held in any suitable storage circuitry, such as illustrated by memory 174 in FIG. 5. The rendering engine 1600 drives the display on a user interface 1602 which receives the video output from the graphics controller 180 illustrated in FIG. 5.

As mentioned, activity at the user interface 1602 can cause the background appearance of replacement tiles to alter. The data structure 1603 is responsible for managing how replacement tiles are delivered to the user interface. Each tile has a tile ID 1605. The tile ID 1605 can define the location on the user interface where the tile is to be replenished, that is governed by the vacancy which has been released by gameplay. This allows the rendering engine 1600 to generate that tile at an appropriate location on the user interface display 1602. Each tile ID 1605 is associated with tile data 1607 which defines how the tile is to be displayed, that is what game element it has associated with it, and whether it has any "blockers" in addition to or instead of a game element, or any foreground or background. Different alternatives for blockers, foreground and background are discussed later. In particular, the background can be the attained or standard background, or a background representing a tidal wave component.

In addition to this tile data, a separate field 1609 can denote whether the tile has an attained or standard background appearance for ease of managing the decision logic described later. The tile background can be modified for a particular tile based on activity at the user interface 1602. Thus, after each gameplay, the tile identifier, which defines the location at which the tile is to be replenished, can have a different tile background associated with it, as modified by activity at the user interface 1602.

Description of Architecture

Figure 14:
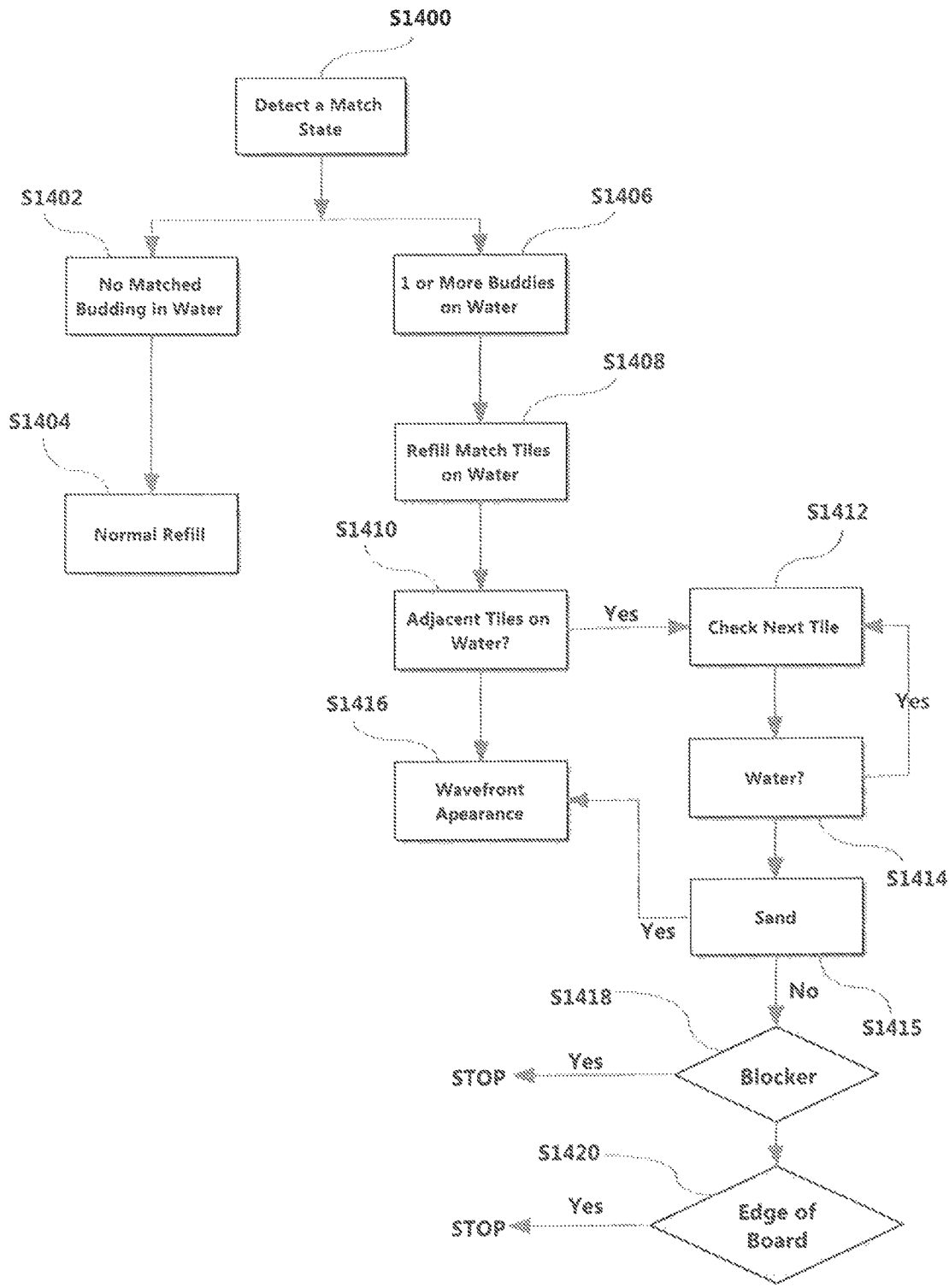
FIG. 14 is a flow diagram showing the steps used to determine the refill process.

FIG. 5 shows a schematic picture of a computing device, containing a Central Processing Unit 172 and Memory 174. The CPU 172 acts according to input given from input devices 170, such as a keyboard, mouse or touchscreen via input parts 176. Computer BUS 178 is used to communicate, both between input devices and the CPU, but also between different controllers within the computer device, such as a graphics controller 180 and a network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard. The flow diagrams of FIGS. 3 and 14 are implemented in software executed by the CPU 172 that can be stored in memory 174. The output screens are supplied to graphics controller 180 for supplying game video output to a user display 1602 (FIG. 16*c*).

Figure 6:
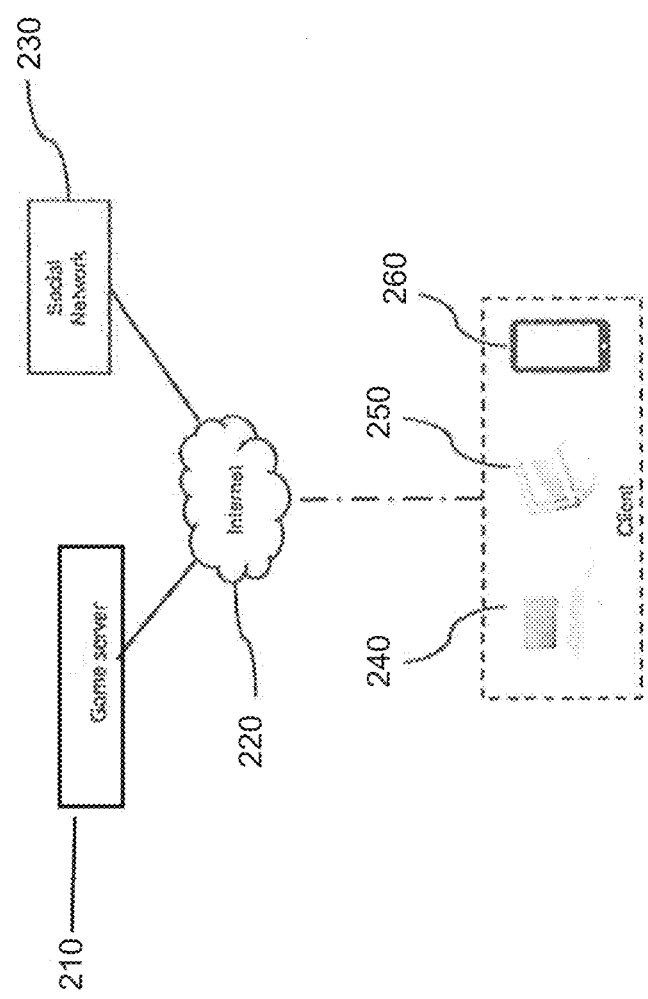
FIG. 6 is a schematic architecture diagram of a context in which a computer device can be utilised to play the game.

FIG. 6 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference.

People skilled in the art will understand that other devices than the exemplary ones listed can be also be used without departing from the scope of the invention as claimed.

Beached Buddies

In a new version of the match-3 switcher game "Beached Buddies", the game objects represent sea creatures, the attained background appearance is water indicated by a blue appearance, to distinguish it from brown sand.

The water is a tile quality (background) that lies under the normal candy crush game objects. It remains associated with particular tiles, while the game objects move and refill above it. It is spread when a match is made, and remains when the matched object disappears. It is also spread according to the consequences of making specific "combo" matches. The spreading area depends upon which type of combo is involved. In this context, "spreading" means that replacement tiles previously of a standard background now have an attained background.

Spreading can be by simply turning additional tiles blue, or by showing a tidal wave effect.

The game objects can be moved by clicking and holding on the object, and then dragging it in any of the 4 directions within the x-y plane of the board (up, down, left or right). The object will only move if by moving it in the selected direction, it will make a group of at least 3 matching objects in a combo, containing either itself or the object adjacent to it in the selected direction. The game board contains game objects in the form of marine animals distributed in a grid formation. The background of the tiles in which they sit are of either 'water' or 'ground' type. The water type is an 'attained background' and thus can be spread to other tiles by making matches.

When placed on a water tile the animals chosen to represent the different game objects have happy/excited facial expressions. This is representative of these animals typically considered to be water loving creatures; a frog, a starfish, an octopus, a whale, and a duck. When on ground tiles, the animals of the game objects have a sad/deflated appearance. Each animal has a colour, and it is the colour and animal type which is the quality upon which a match is decided, not the specific image representation or the tile type upon which the animal is positioned. For example a match can contain both 'sad' and 'happy' animals. The type of tile, i.e. ground or water, affects only the result of a match. For example, a match-3 completely on ground tiles results in the disappearance of the matched animals, and the refilling of the board from above. A match-3 on tiles where one or all of them are water tiles, results in any ground tiles under the animals directly involved in the match, turning into water tiles. The matched animals disappear, as they did on the ground tiles, and the game board refills from above, but the tiles upon which the match was made are now, and remain to be, water tiles.

Figure 7:
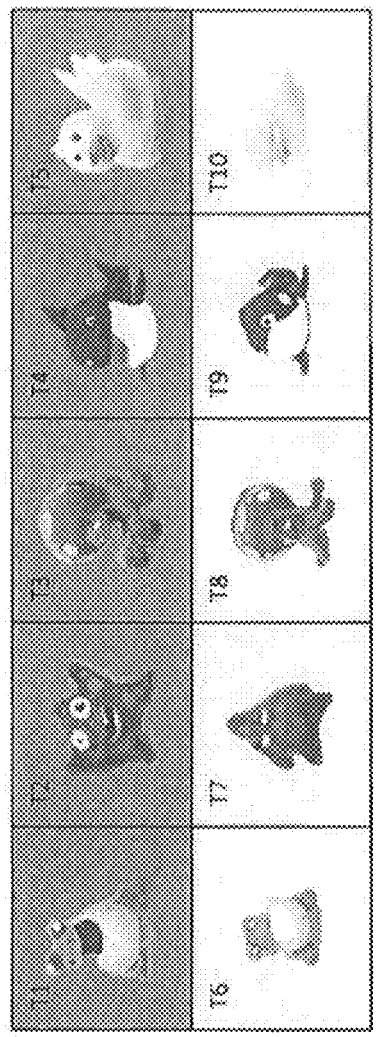
FIG. 7 shows an edited version of a game board, illustrating the various game pieces used and their background dependent appearance.

FIG. 7 shows the game objects for 'Beached Buddies'. When placed on a water tile, T1-T5, the animals chosen to represent the different game objects have happy/excited facial expressions. When on ground tiles, T6-T10, the animals of the game objects have a sad/deflated appearance.

Figure 8A:
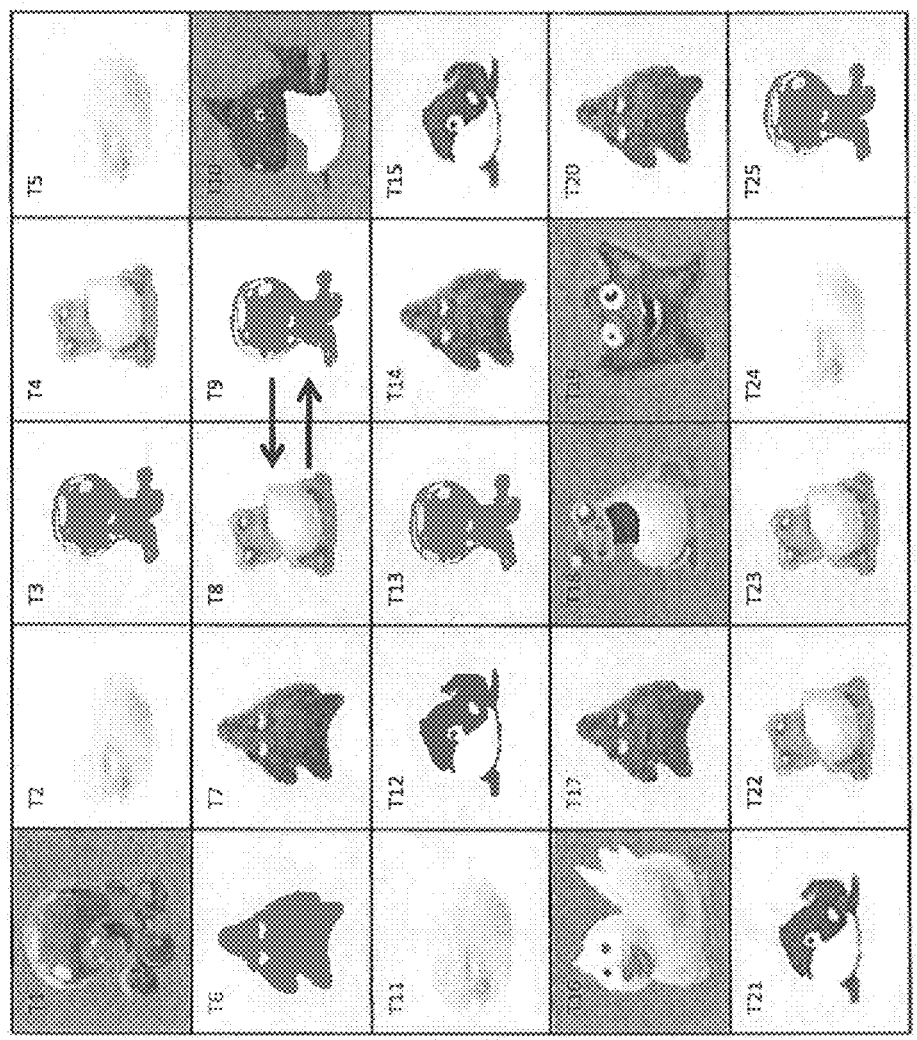
FIGS. 8(a)-(c) show an edited version of a game board, illustrating how a match made on tiles all possessing a ground background does not result in any tiles attaining a water background.

FIG. 8a shows an edited version of the game board as it will be rendered to a user on the display of his computer device. The board has been reduced to 5×5 grid for illustrative purposes. Each tile of the board contains a reference letter T, followed by a reference number from 1 to 25. The board has been filled with game objects in the form of marine animals, and the tiles in which they sit are of either 'water' or 'ground' type. Arrows indicate a move that will create a match-3.

Figure 8B:
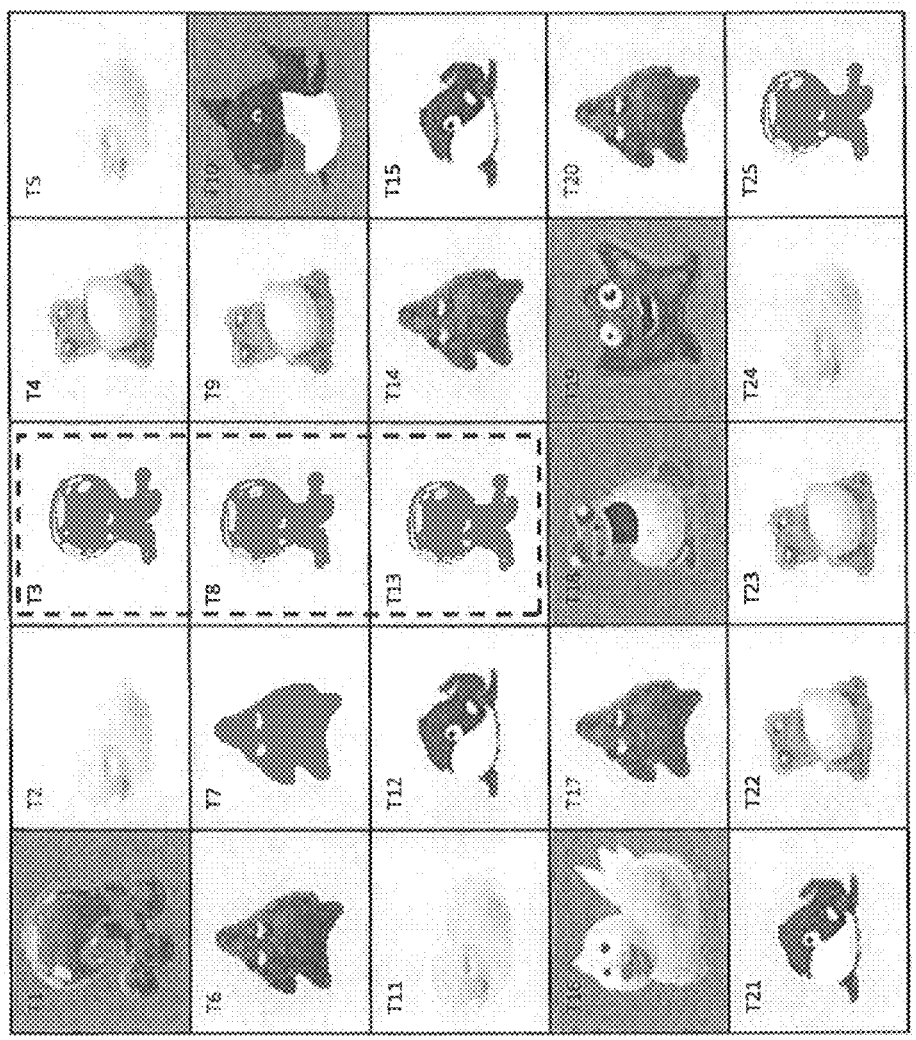

FIG. 8bb shows the game board after the frog in tile T8 has been dragged to the right and into tile T9, swapping places with the octopus originally in tile T9. The match-3 in tiles T3, T8, and T13 is outlined with a dashed line. The 3 tiles on which the match is made are all ground tiles, and no water tiles.

Figure 8C:
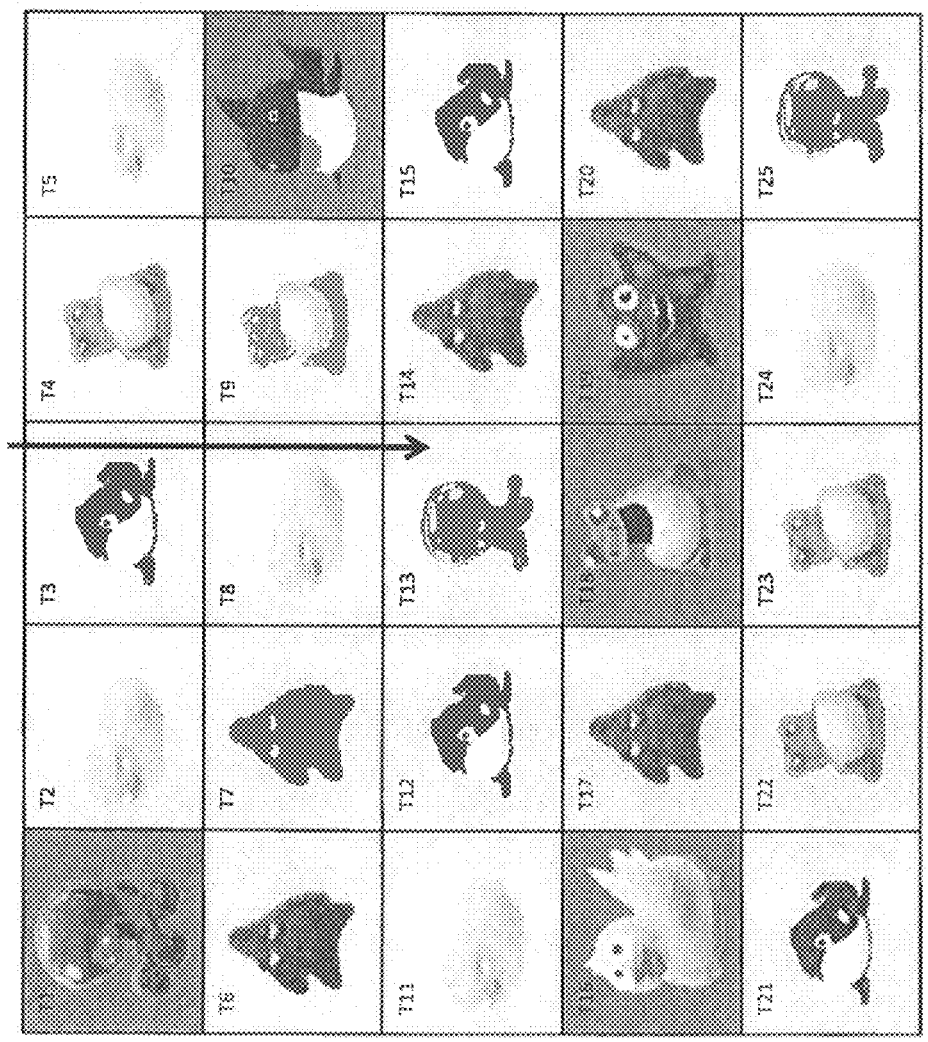

FIG. 8c shows the board after the match-3 has disappeared. There were no water tiles involved in the match, and therefore no water was spread. The match disappears, and the board is refilled from above, as shown by the arrow.

Figure 9A:
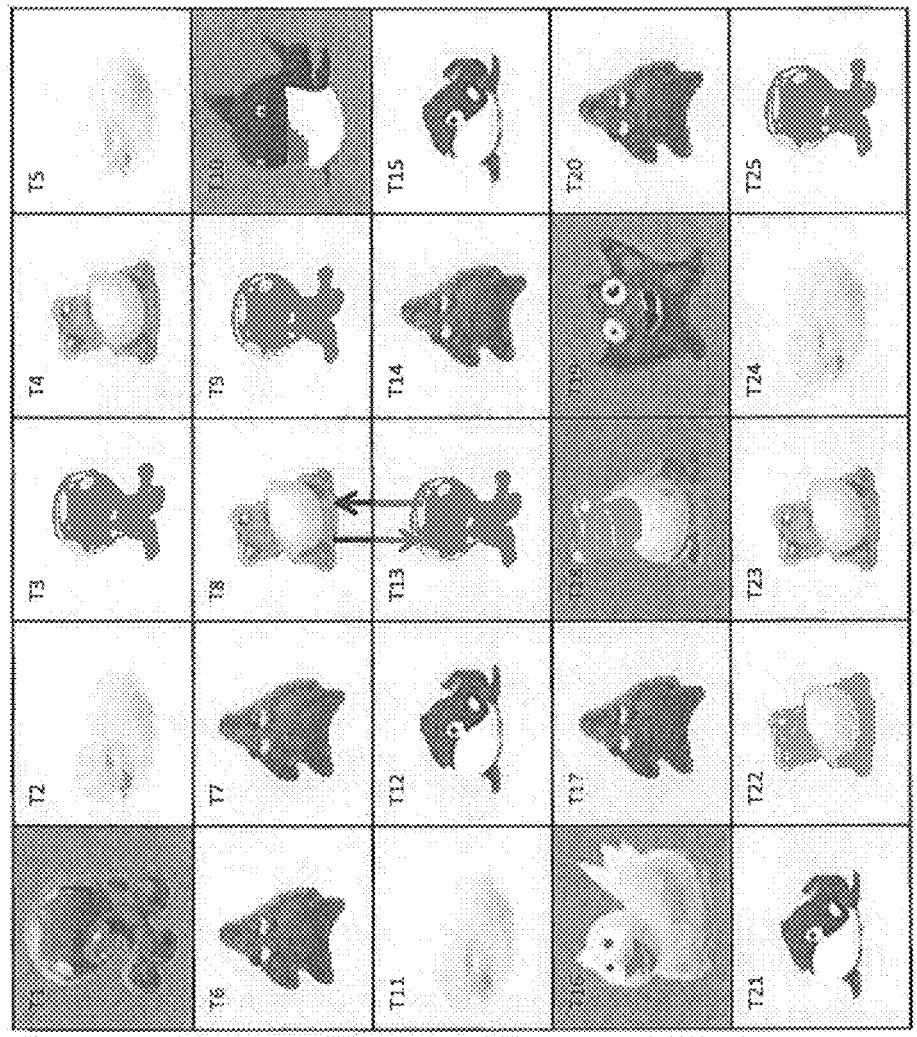
FIGS. 9(a)-(c) show an edited version of a game board, illustrating how a match made on tiles where at least one tile has attained the water background, results in the spreading of the water background to all tiles involved in the match.

FIG. 9a show an edited version of the game board. Arrows show a move that will result in a match-3.

Figure 9B:
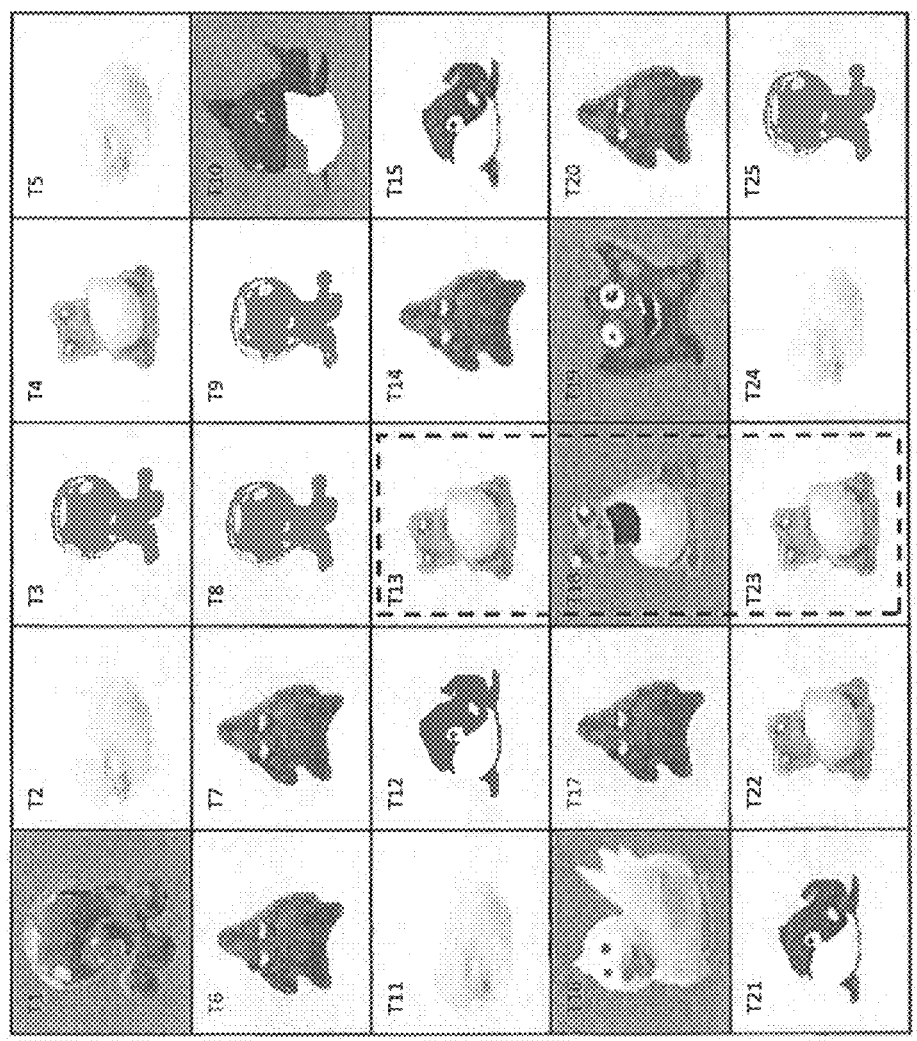

FIG. 9b shows the game board after the frog in tile T8 has been dragged downwards into tile T13, swapping places with an octopus which has moved from tile T13 to T8. This has resulted in the match-3, outlined by a dashed line, in tiles T13, T18, and T23. Tiles T13 and T23 are ground tiles, but tile T18 is a water tile. The water tile is denoted by a blue colour around the game object (marine animal), and indicated by the appearance of the game object. Specifically a marine animal of a 'happy' demeanour. The match is still a match, regardless of the different types of attained background it's tiles have, or whether the game objects are 'happy' or 'sad', they are the same marine animal and the same colour.

Figure 9C:
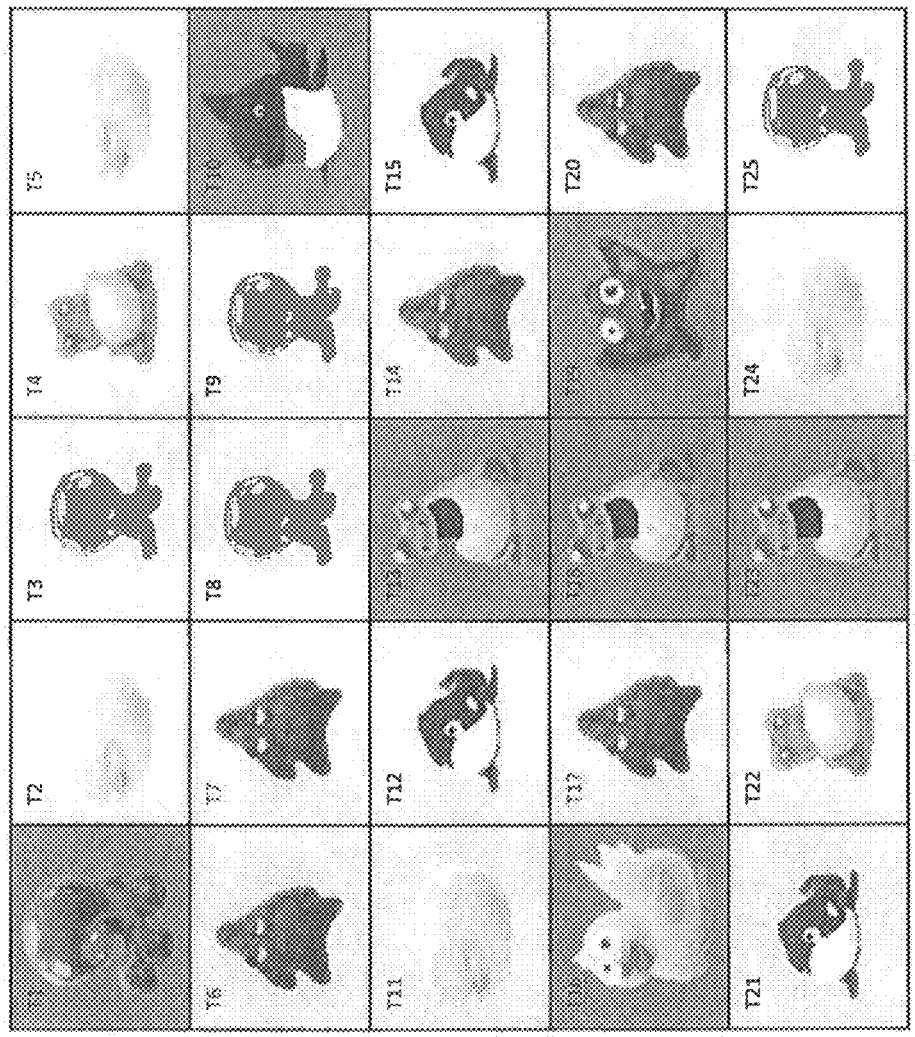

FIG. 9c shows the game board after the move in FIG. 9a has been made. As tile T18 was a water tile, and directly involved in the match, water spreads to the other tiles directly involved in the match. Tiles T13 and T23 are now water tiles. As a consequence the tiles are now blue in colour, and the frogs in T13 and T23 are now 'happy' frogs.

As previously shown in FIGS. 8b and 8c, the matched game objects are removed from the board, and the spaces refilled by adding game objects to the board from above (the positive y direction in the plane of the game board).

Figure 10A:
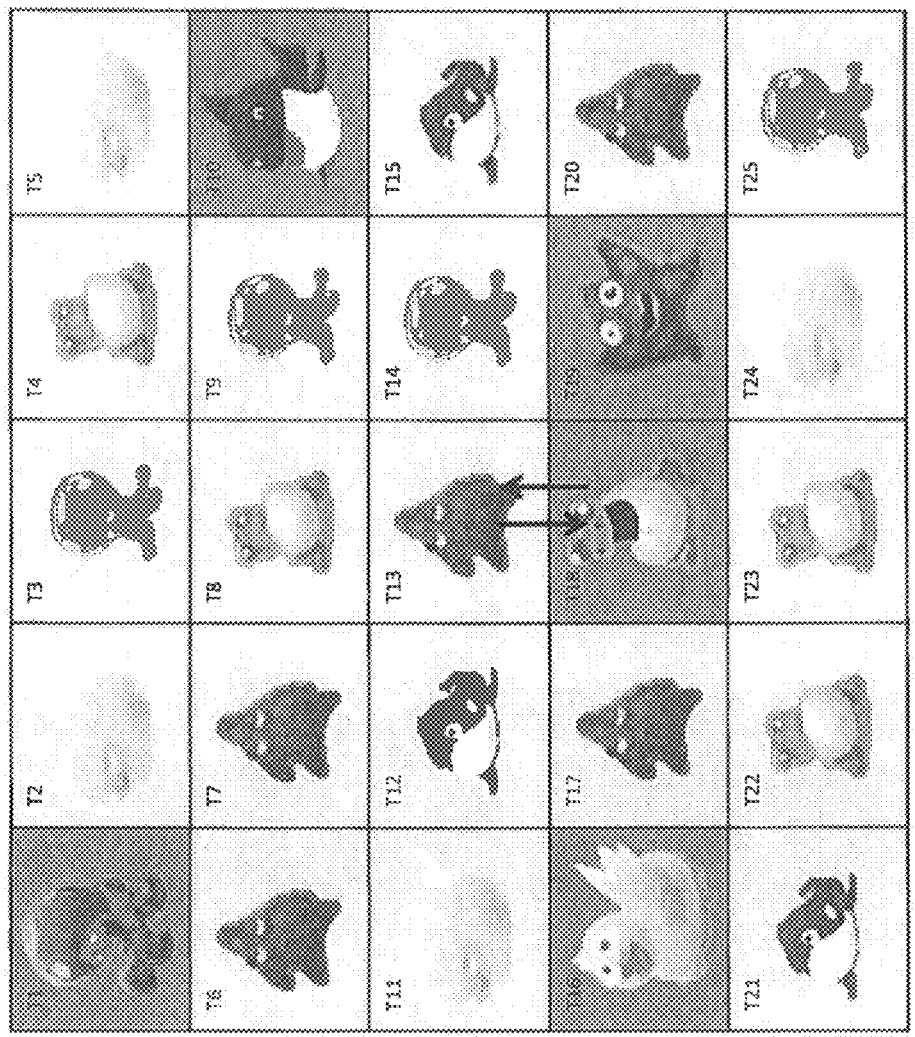
FIGS. 10(a)-(e) show an edited version of a game board, illustrating the result of a 4-combo match on tiles where at least one tile has attained a water background.

FIG. 10a shows an edited version of the game board. Arrows indicate a move that will create a 4-combo match. The starfish in tile T13 will be dragged downwards into tile T18, swapping places with the frog currently in tile T18. In this situation the starfish is currently on a ground tile, but will be moved to a water tile. The frog will move from a water tile to a ground tile. The marine animal and its associated colour will remain the same, however the 'sad' starfish will become 'happy' on moving into the water, and the 'happy' frog will become 'sad' on moving onto the ground.

Figure 10B:
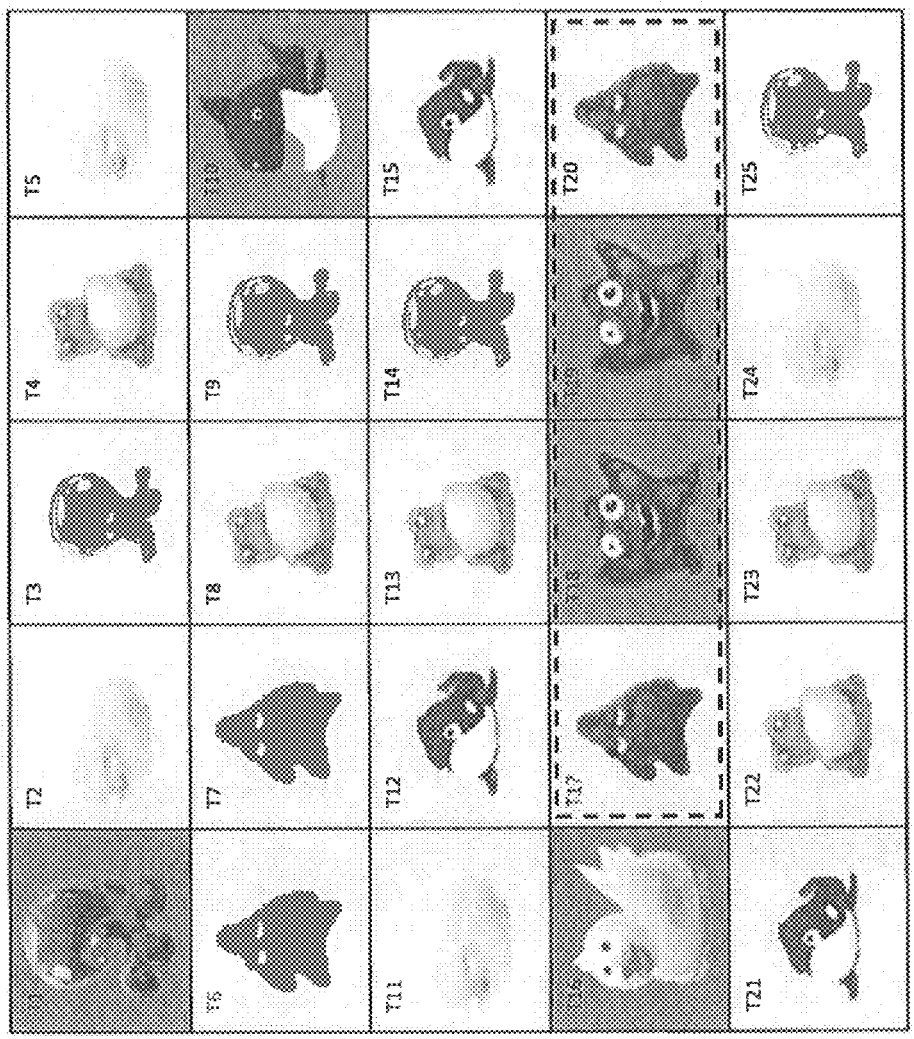

FIG. 10b shows the match created in tile T17, T18, T19, and T20 outlined with a dashed line. This 4-combo lies across two tiles having attained backgrounds of water, T18 and T19, and two ground tiles T17 and T20. The expressions of the marine animal game objects are in keeping with the tile backgrounds they are illustrated as still occupying.

Figure 10C:
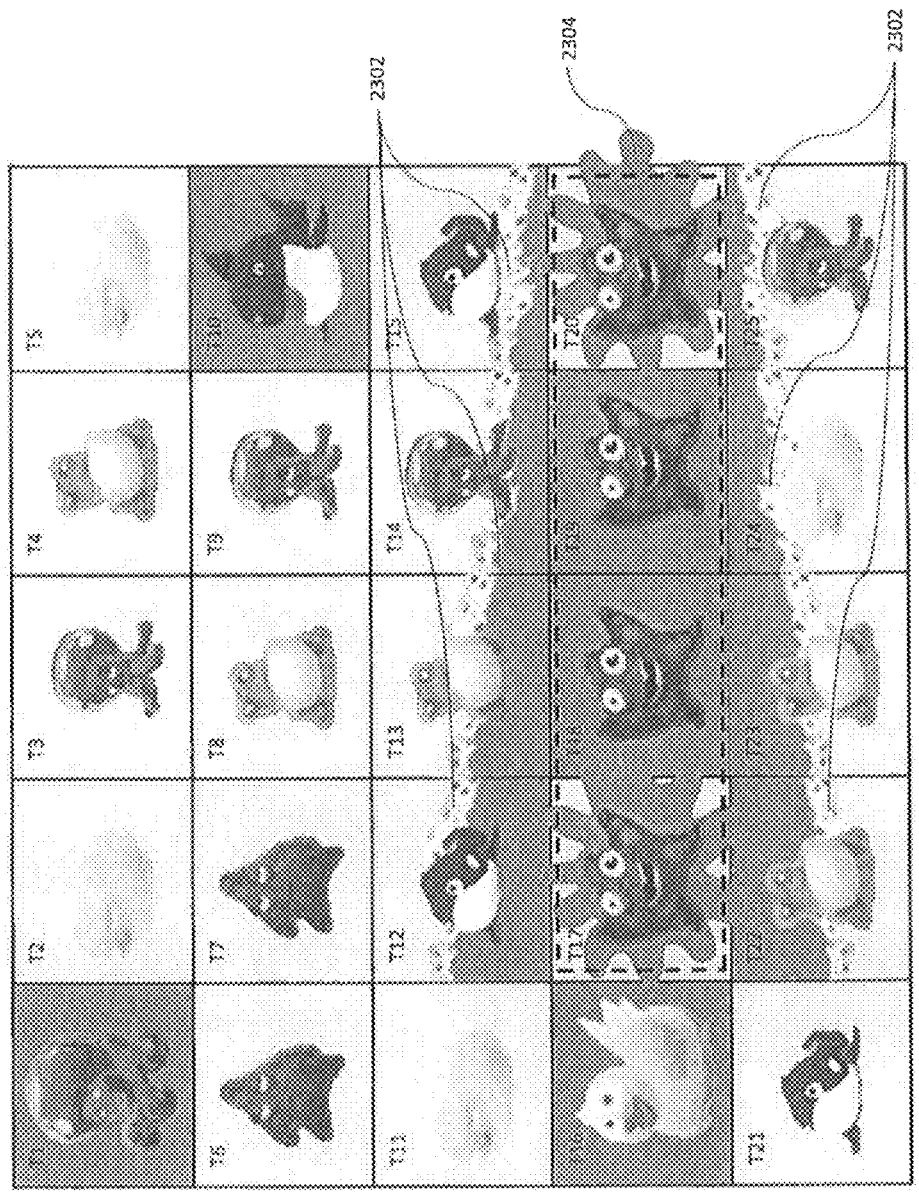

FIG. 10c shows the result of the 4-combo match being made. The two ground tiles within the 4-combo, T17 and T20, attain the background of water, with a splash 2304 around the marine animal game object, and a change of the animals expression from 'sad' to 'happy'. The 4-combo also results in tidal waves, 2302. The tidal waves emanate from the lateral sides of the 4-combo. Each tile-width wave travels outwards, along the columns perpendicular to the 4-combo, until it reaches the next ground tile or the edge of the game board. The tidal waves are emitted from all tiles in the 4-combo, whether they have attained the water background or not. In this example, all the tidal waves meet a ground tile immediately.

Figure 10D:
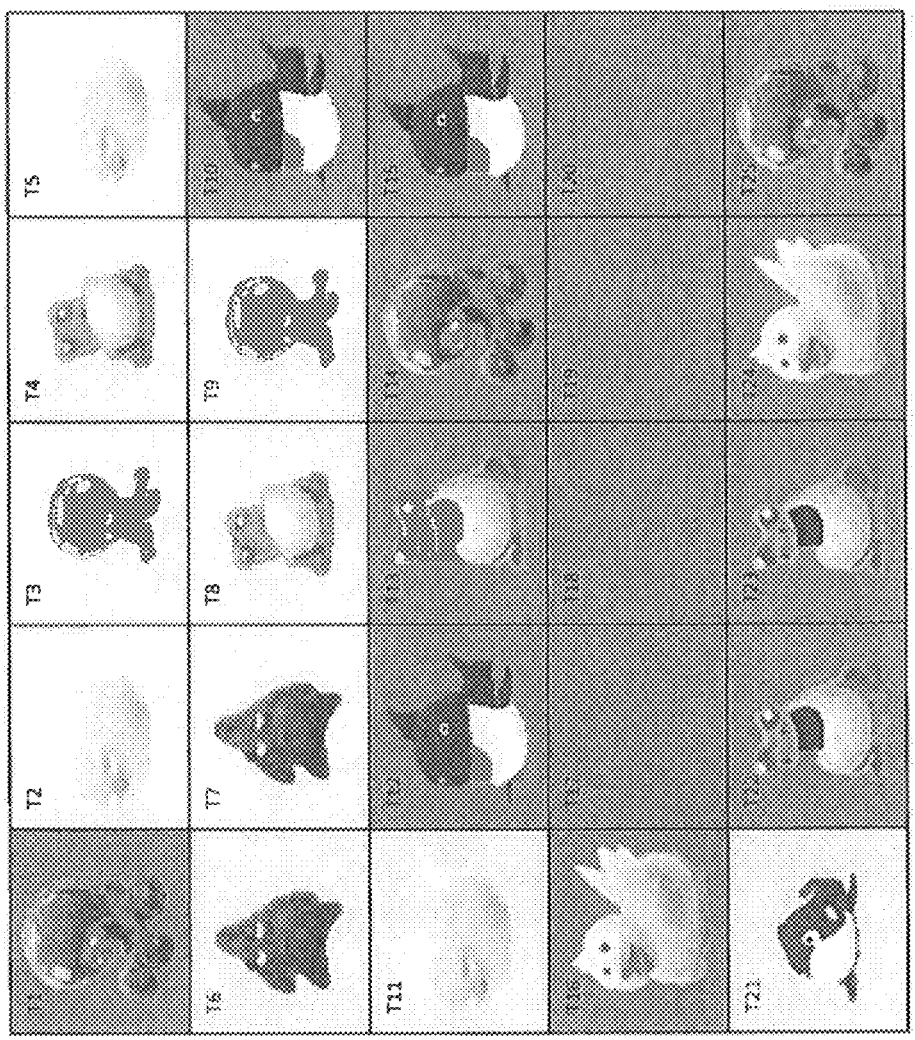

FIG. 10d shows the game board after the tidal waves have met the first ground tile in their paths, T12, T13, T14, T15, T22, T23, T24, and T25, and caused each to attain a background of water. The marine animal game objects in these tiles have subsequently changed from having a 'sad' expression to a 'happy' expression. The 4 marine animal game objects directly involved in the 4-combo have been removed from tiles T17, T18, T19, and T20.

Figure 10E:
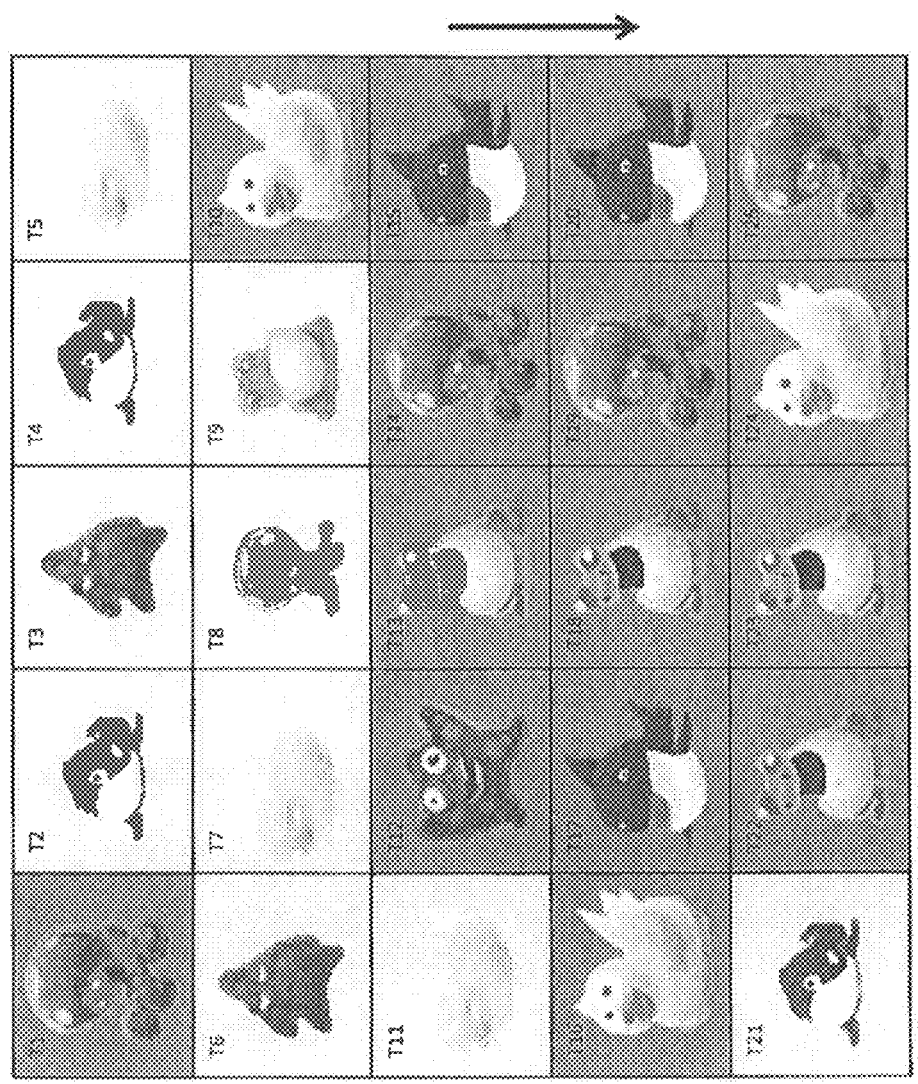

FIG. 10e shows the game board having been refilled from above, as shown by the arrow. The marine animal game objects have moved down to fill the empty tiles shown in FIG. 10d, and new tiles have entered the top tiles in the respective columns. As a result of this, the animals in tiles T5, T7, T8, and T9, move from a ground tile to a tile which has an attained background of water. Subsequently their expression has changed from 'sad' to 'happy'.

Figure 11A:
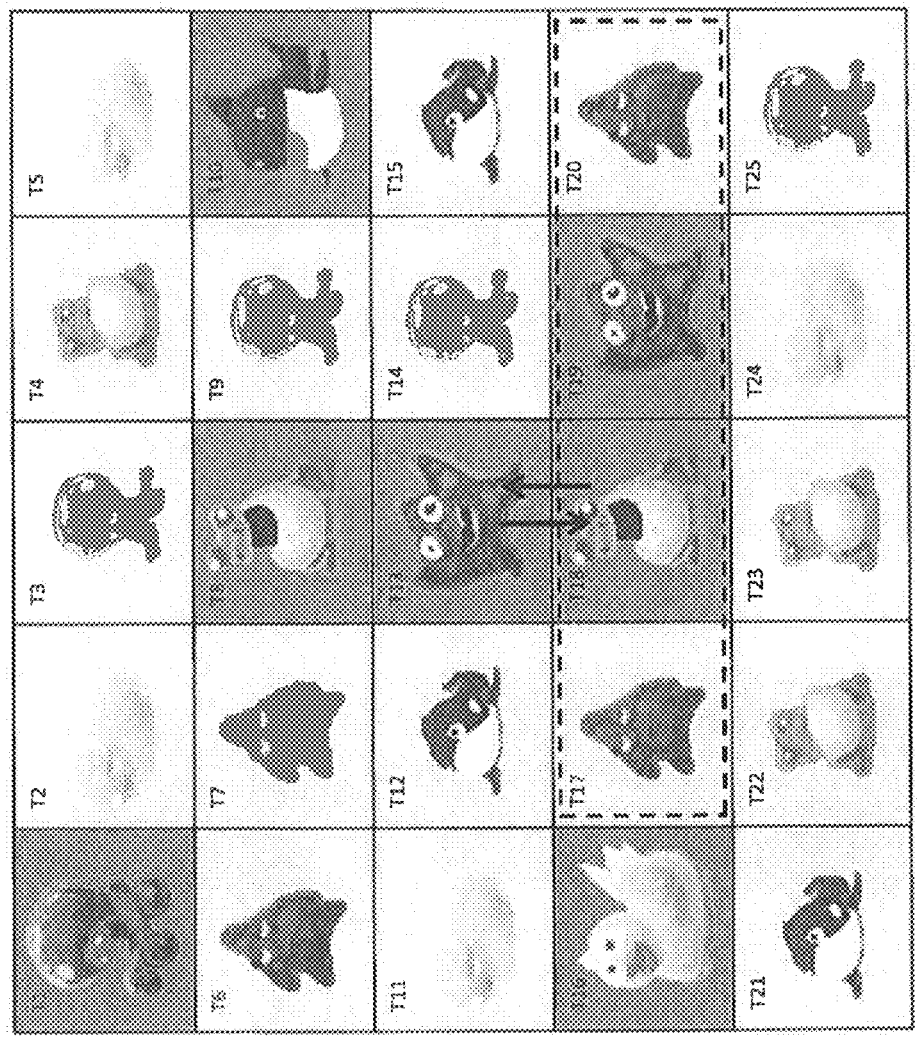
FIGS. 11(a)-(f) show an edited version of a game board, illustrating the result of a 4-combo match on tiles where at least one tile has previously attained a water background, and a tile adjacent to the 4-combo has also previously attained a water background.

FIG. 11a shows the same game board as shown in FIG. 10a23a. However, tiles T13 and T8 have already attained a water background, and contain 'happy' animals. The same move in tiles T13 and T18 is shown as in FIG. 10a, and the position of the resulting 4-combo is shown outlined by a dashed line.

Figure 11B:
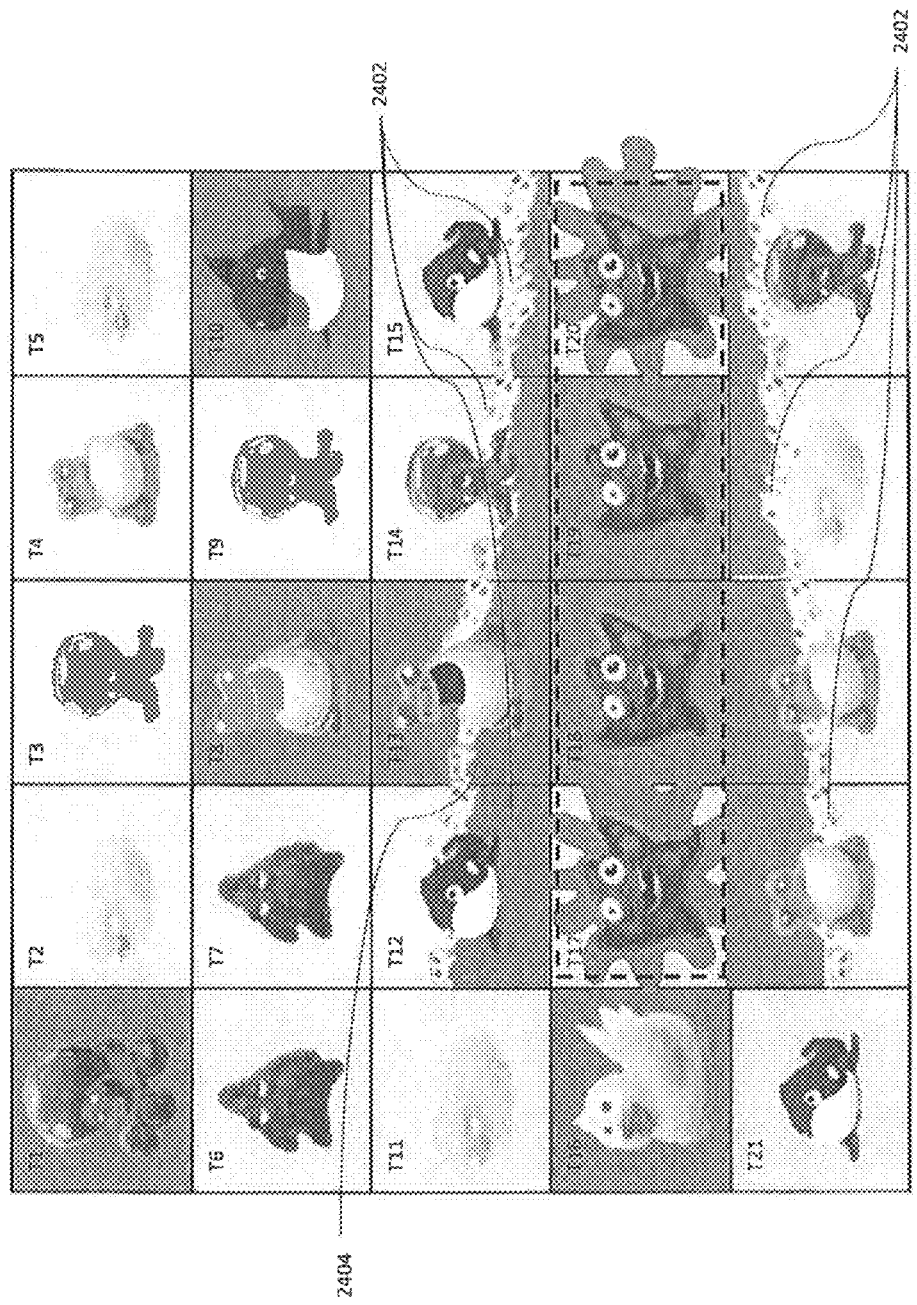

FIG. 11b shows the resulting tidal waves, 2402, reaching the nearest ground tile in their perpendicular columns. However, as tile T13 had already attained a water background, the wave does not stop here in this column.

Figure 11C:
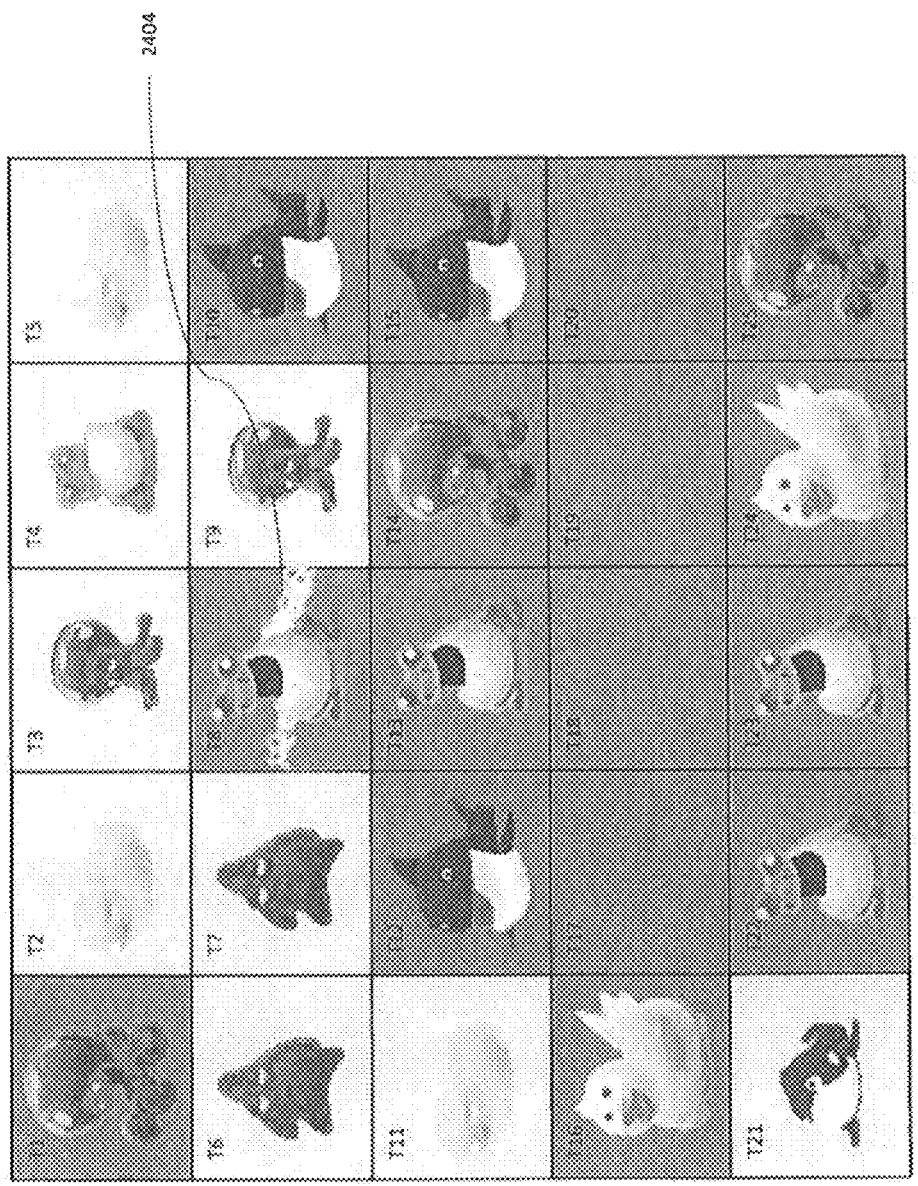

FIG. 11c shows the game board after the tidal waves have reached their neighbouring tiles. All but one of these (T13) are ground tiles, and as such the tidal wave does not go onto the next tile in the column, but causes these tiles (T12, T14, T15, T22, T23, T24, and T25) to attain a water background. Subsequently the animals occupying these tiles have 'happy' expressions. The tidal wave in tile T13 2404 travels on to the next tile T8. This tile had also already attained a water background, and therefore the tidal wave does not stop here either.

Figure 11D:
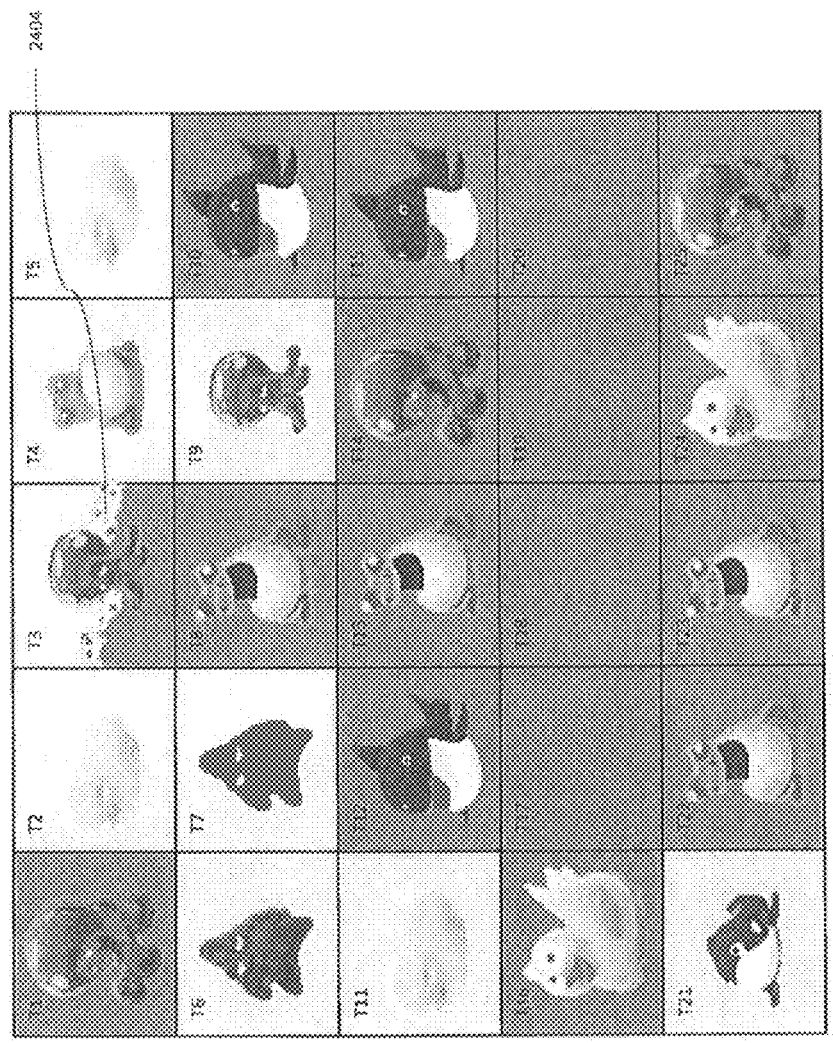

FIG. 11d shows the game board after the tidal wave 2404 reaches tile T3. Tile T3 is a ground tile, occupied by a 'sad' octopus.

Figure 11E:
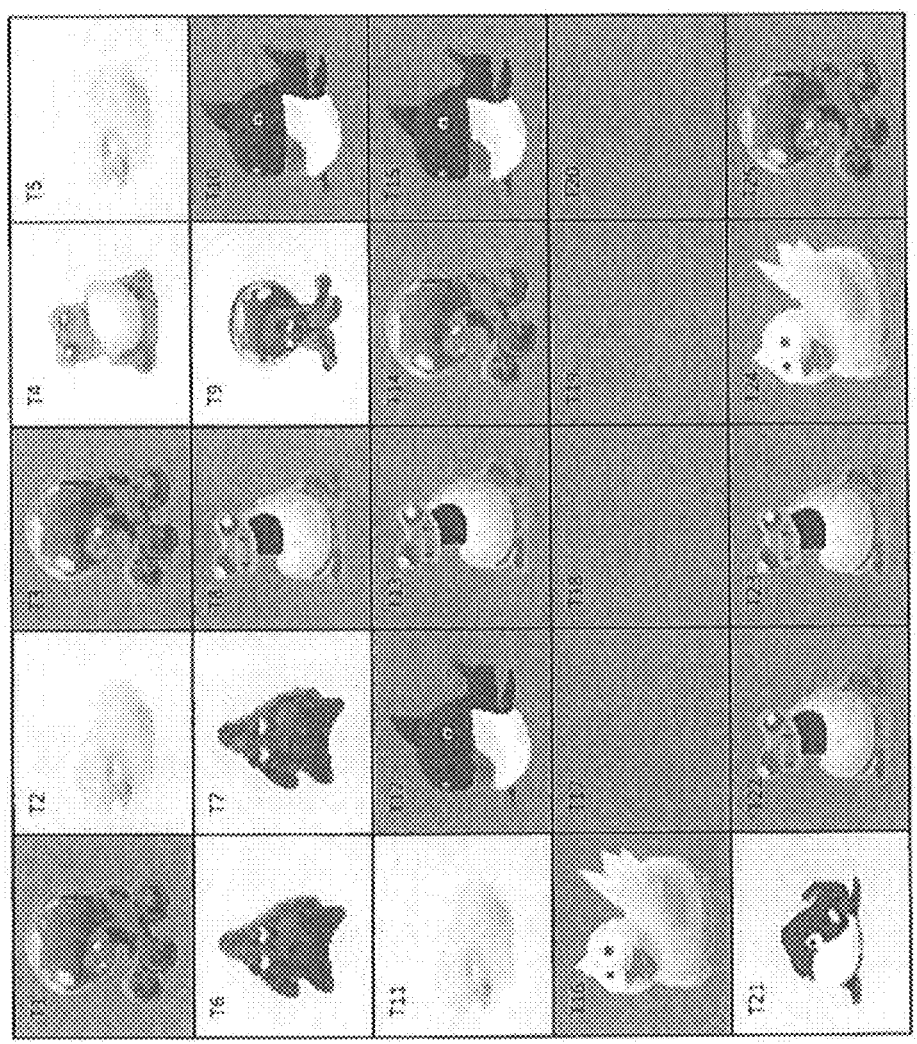

FIG. 11e shows the game board after the tidal wave has reached tile T3, and enabled it to attain a water background. The 'sad' octopus is now 'happy'.

Figure 11F:
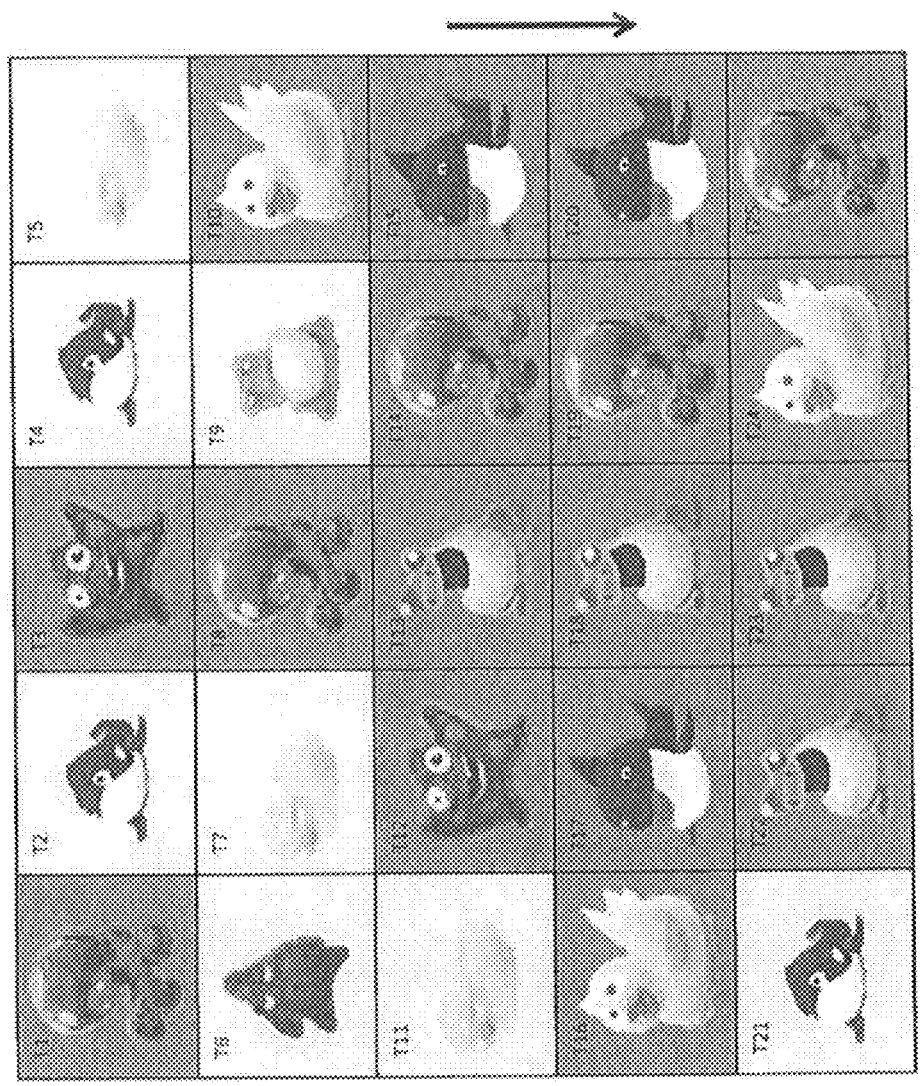

FIG. 11f shows the game board having been refilled from above, to fill tiles T17, T18, T19, and T20. The direction of which is indicated by the arrow at the right-hand side of the figure. The marine animal game objects from ground tiles T7, T9, and T5, have moved to water tiles, T12, T14, and T10, and subsequently the expressions of the animals have changed from 'sad' to 'happy'.

Figure 12A:
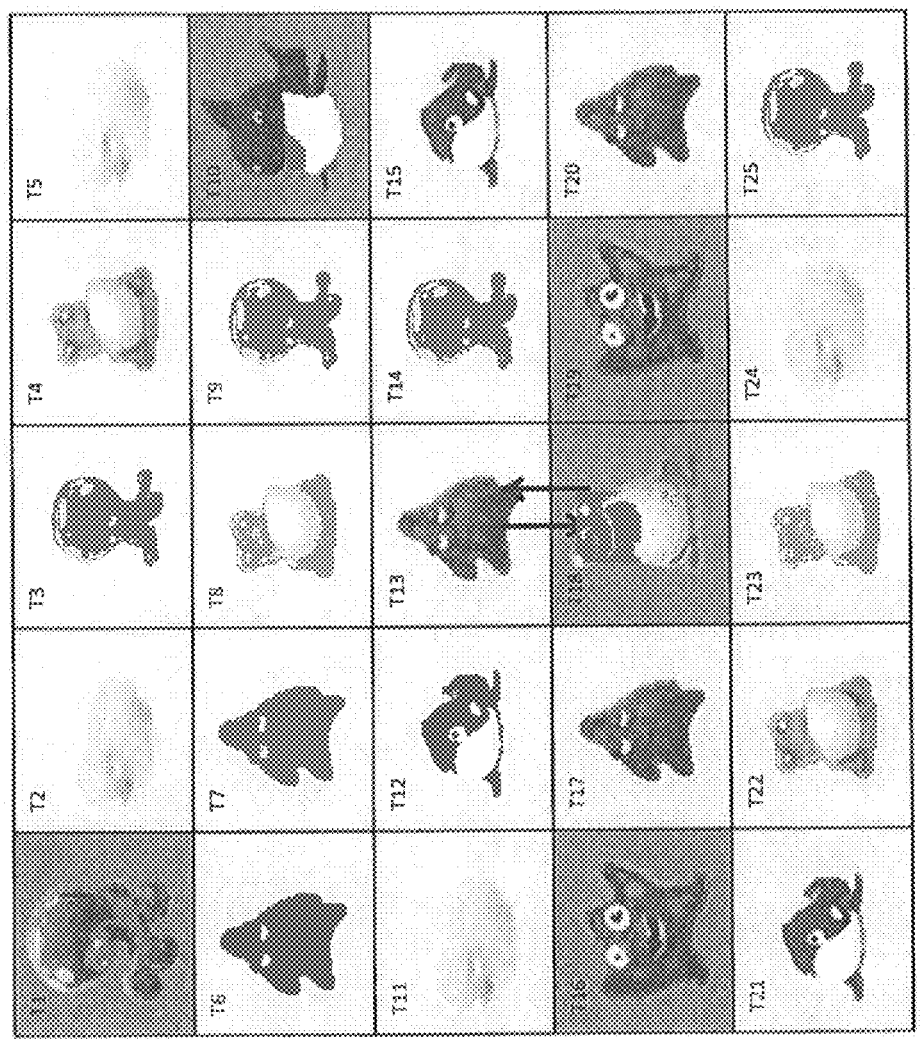
FIGS. 12(a)-(i) show an edited version of a game board, illustrating the result of a 5-combo match on tiles where at least one tile has attained a water background, creating a water fountain.

FIG. 12a shows an edited version of the game board. A move is indicated by two arrows that will create a 5-combo match in tiles T16, T17, T18, T19, and T20. This is the same move as shown in FIG. 23a, though now tile T16 is instead occupied by a starfish. The 5-combo is a match across tiles including at least one which has an already attained background of water, and thus incurs the consequential water spreading result.

Figure 12B:
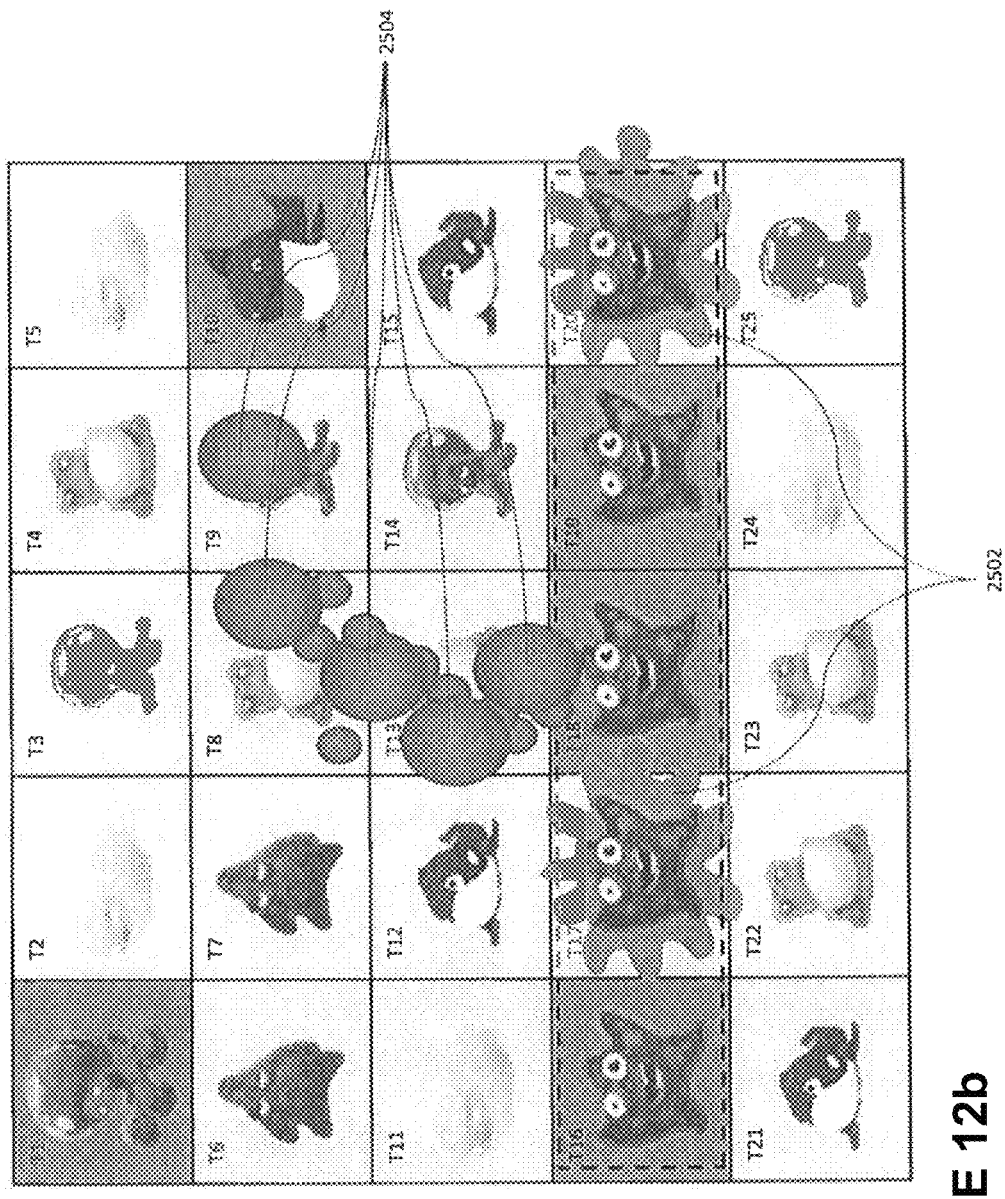

FIG. 12b shows the immediate result of the 5-combo match. Tiles T17 and T20 attain a water background, and the expressions of the starfish occupying them change from 'sad' to 'happy'. A splash 2502 marks the transition from ground to water tile. Five large water droplets 2504 are released as a water fountain from the tile T18 in the centre of the 5-combo. The centre tile in relation to the 5-combo is where the water fountain appears from. This is always the case, regardless of the respective position of the marine animal game object that was moved to complete the 5-combo.

Figure 12C:
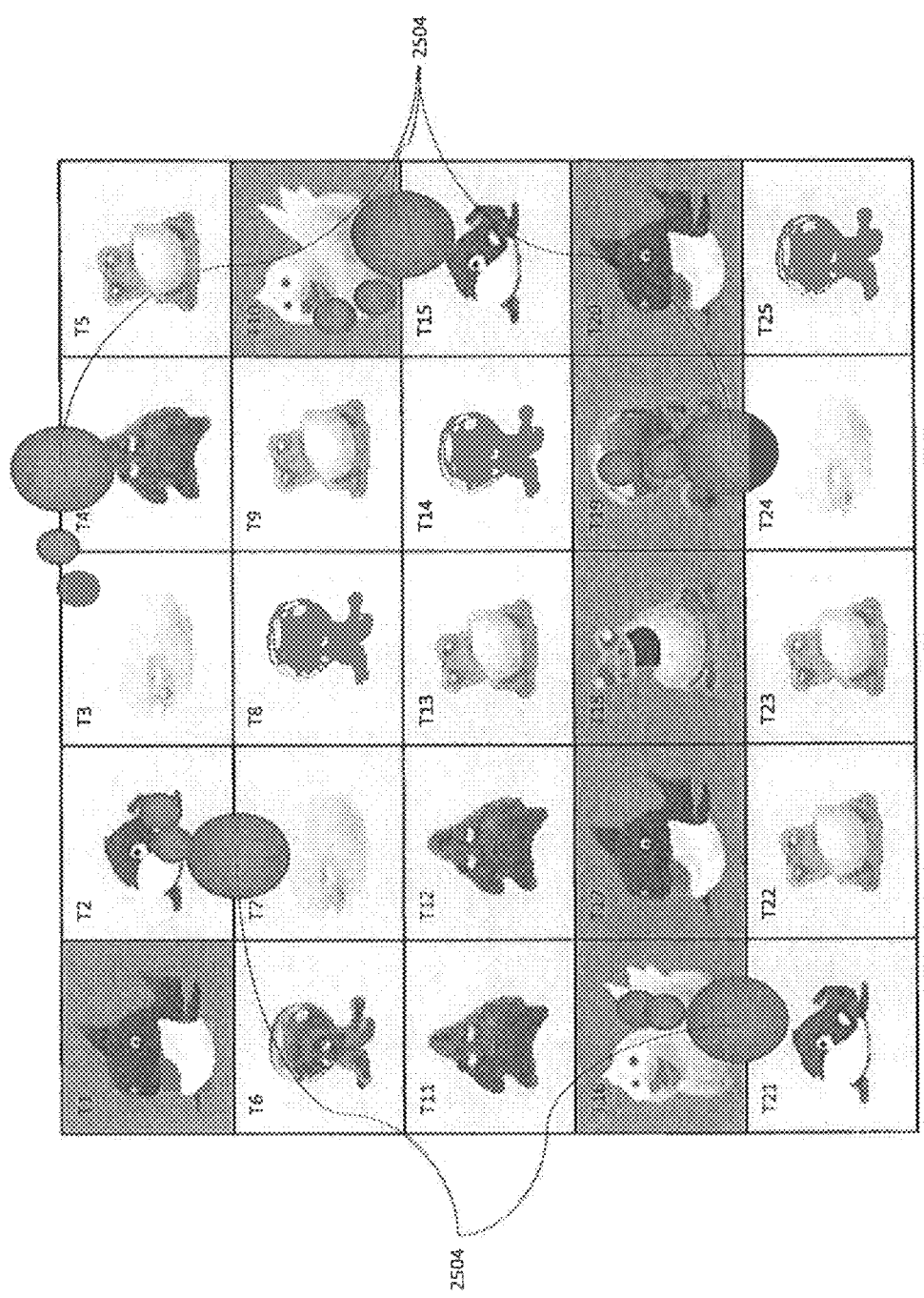

FIG. 12c shows the game board after the game objects in the 5-combo match have been removed from the board, and the spaces refilled from above. The resulting five large water droplets 2504 from the water fountain have spread out across the game board. Each droplet moves towards a random remaining ground tile. If less than 5 ground tiles remain, water tiles are selected as targets instead. Any remaining ground tiles will be prioritised as targets before any water tiles.

Figure 12D:
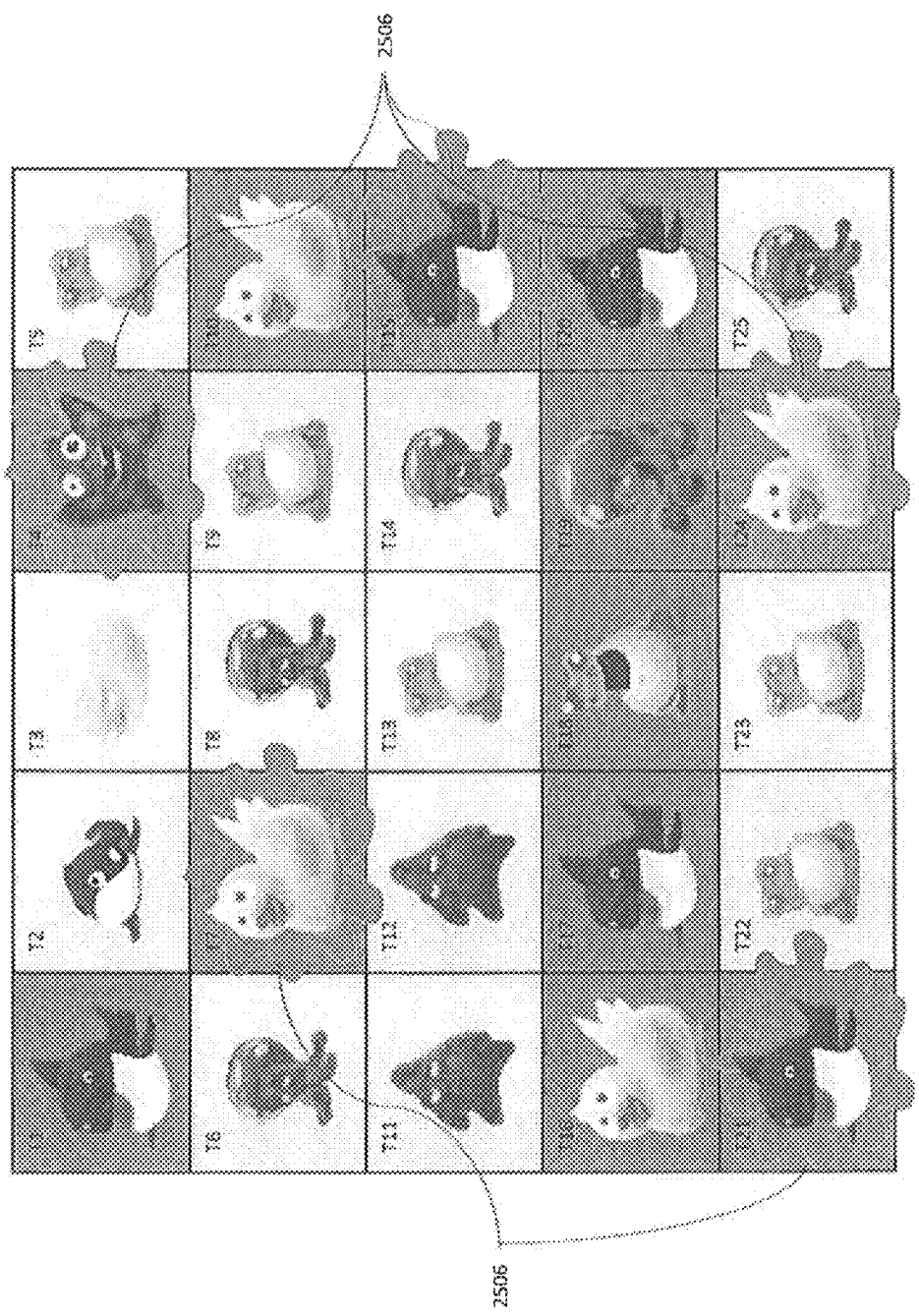

FIG. 12d shows the result of the five large water droplets landing on five respective ground tiles T4, T7, T15, T21, and T24. The droplets create a splash 2506 which signifies these ground tiles attaining a water background.

Figure 12E:
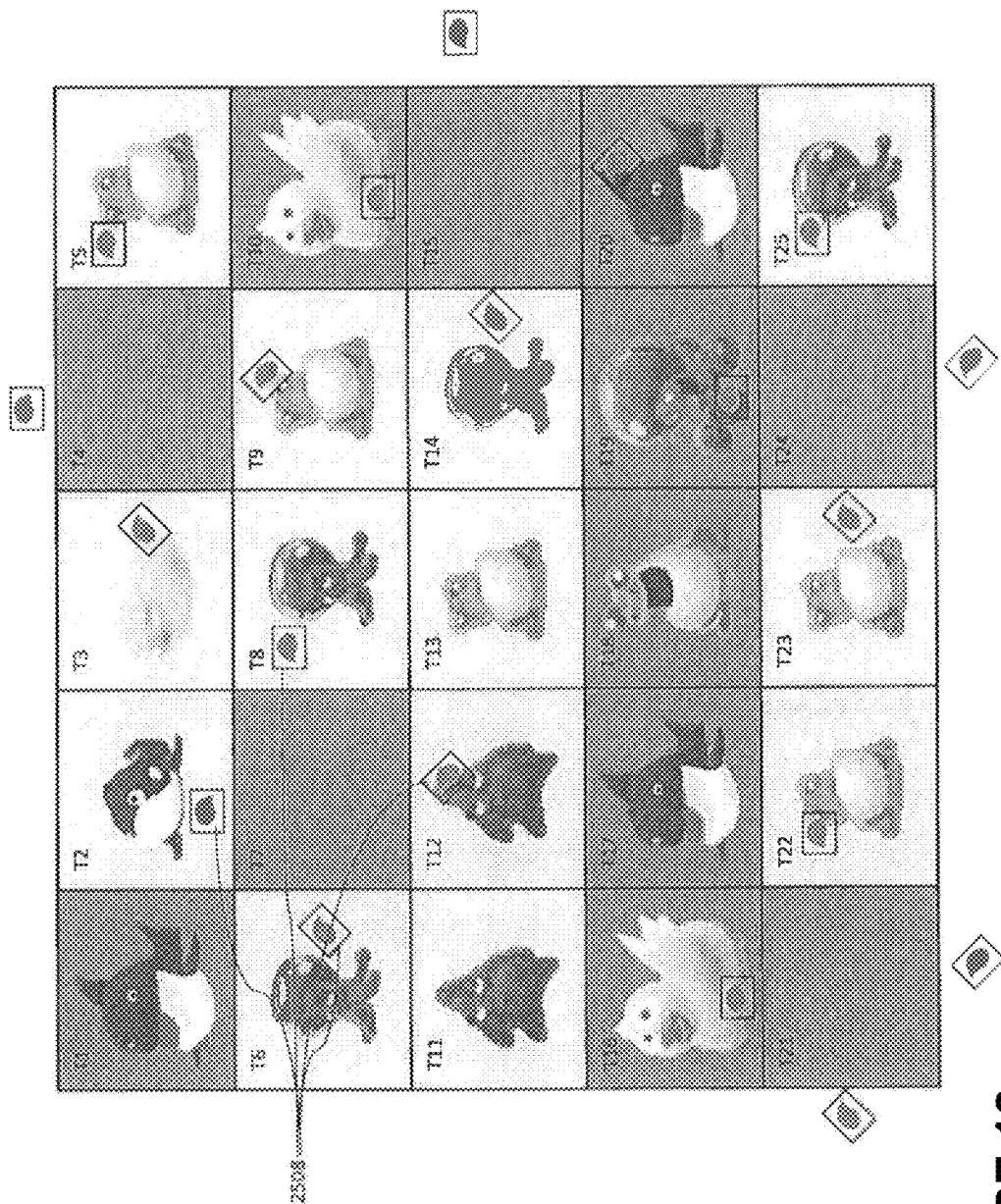

FIG. 12e shows the game board after the marine animal game objects in the tiles splashed by the large water droplets have been removed. The splashes 2506 resulting from the large water droplets 2504 also splash the four tiles adjacent to the tile on which they occur. This is illustrated in the figure by small water droplets 2508 within the adjacent tiles. For example, the large droplet landing on tile T7 has resulted in the splashing of adjacent tiles T2, T6, T8, and T12. Equivalents of the small droplets 2508 can also be seen adjacent to tiles T4, T15 T21, and T24.

Figure 12F:
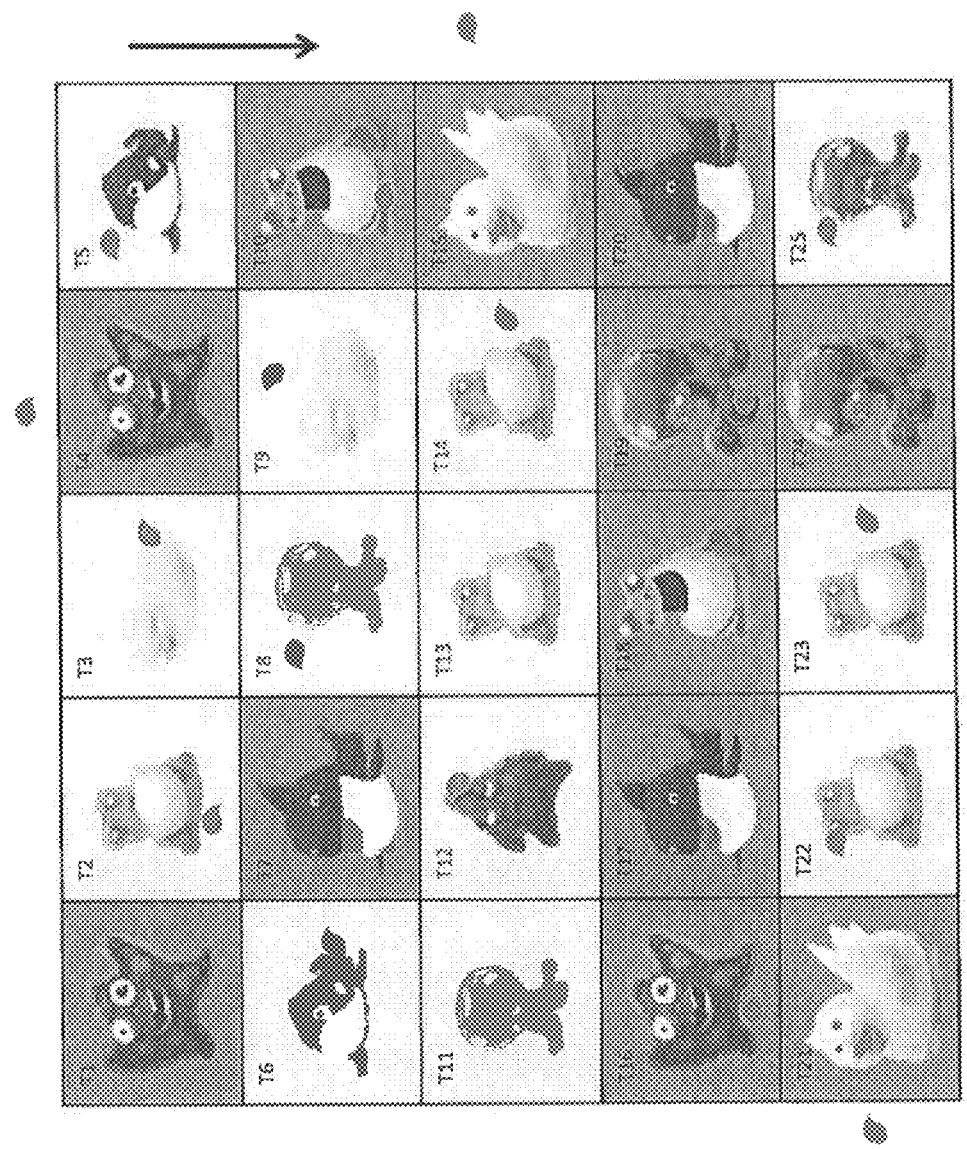

FIG. 12f shows the game board after the spaces on the board have been refilled from above, as indicated by the arrow. Tiles T4, T7, T15, T21, and T24 have retained their water background. The tiles adjacent to those impacted by the five large water droplets continue to be splashed.

Figure 12G:
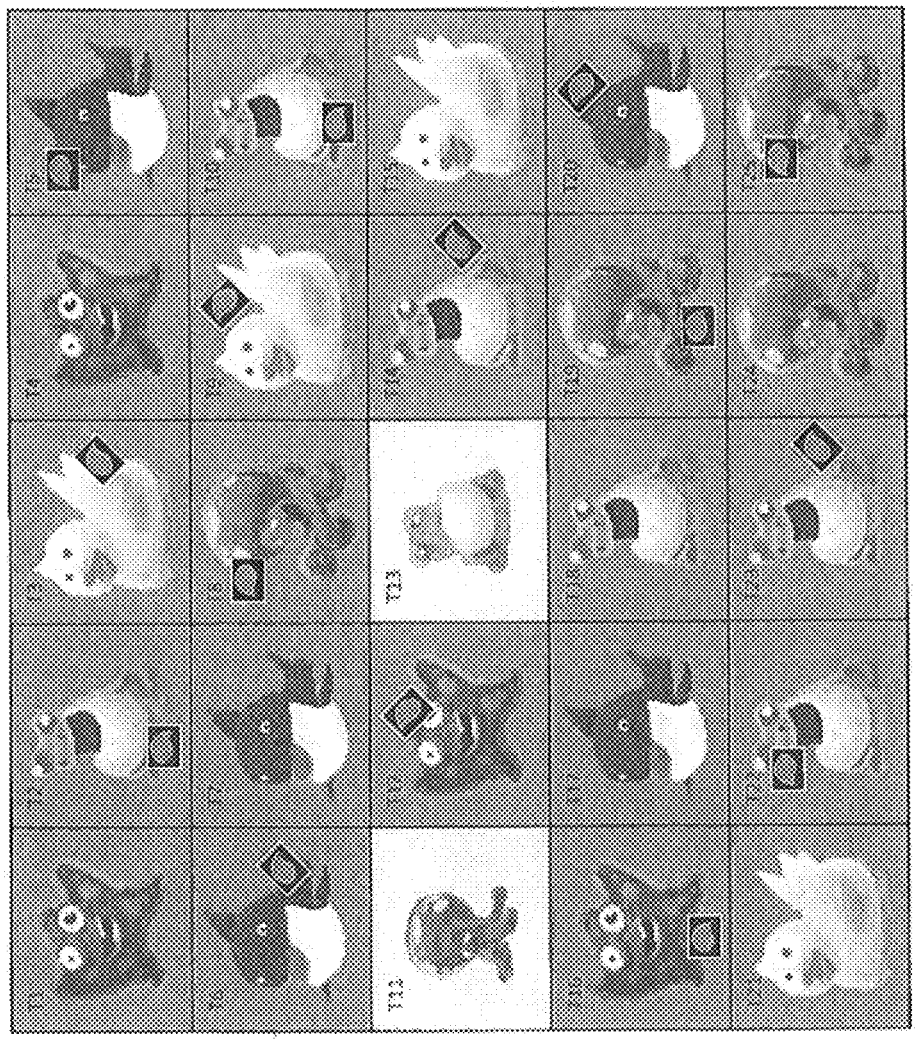

FIG. 12g shows all the splashed adjacent tiles to T4, T7, T15, T21, and T24 having attained a water background as a result of being splashed. The splashes within the tiles have been highlighted to shown their location more clearly against the blue background.

Figure 12H:
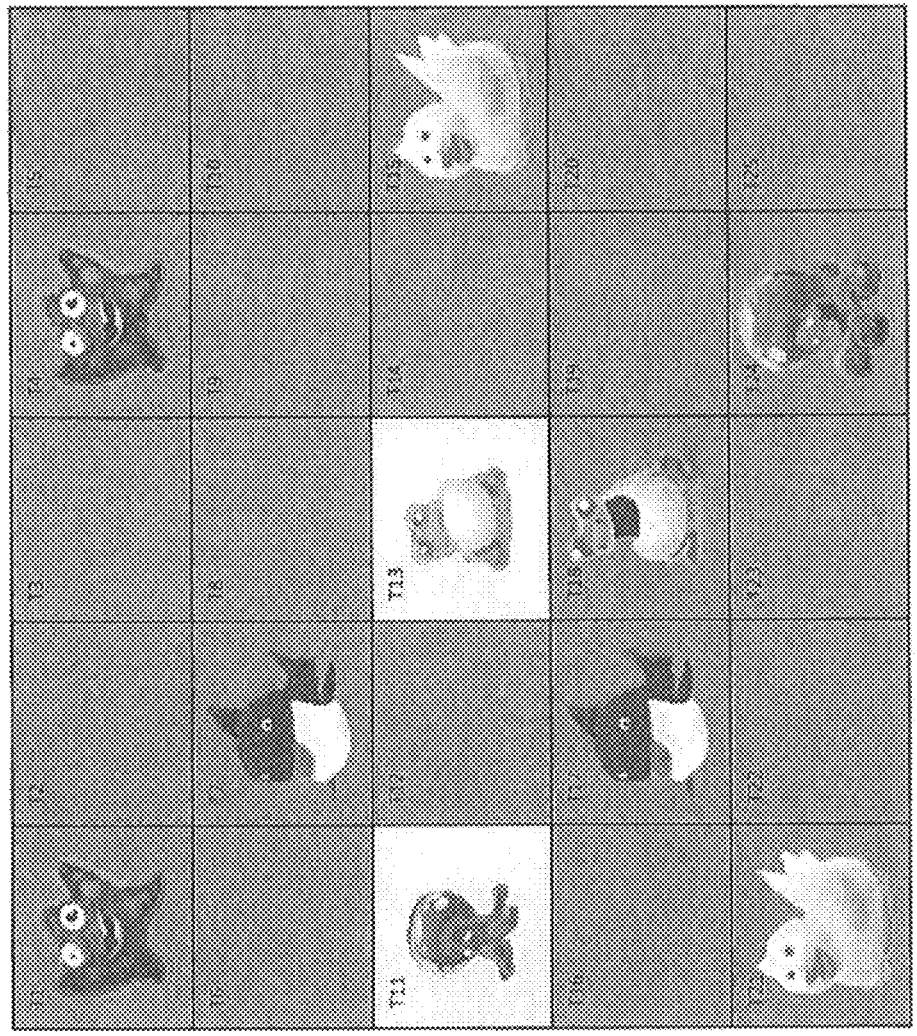

FIG. 12h shows the game board after the animal game objects in the adjacent tiles T2, T3, T5, T6, T8, T9, T10, T12, T14, T16, T19, T22, T23, and T25, have been removed as a result of being splashed. In this illustration, this results in most of the game objects being removed due to the edited game board size.

Figure 12I:
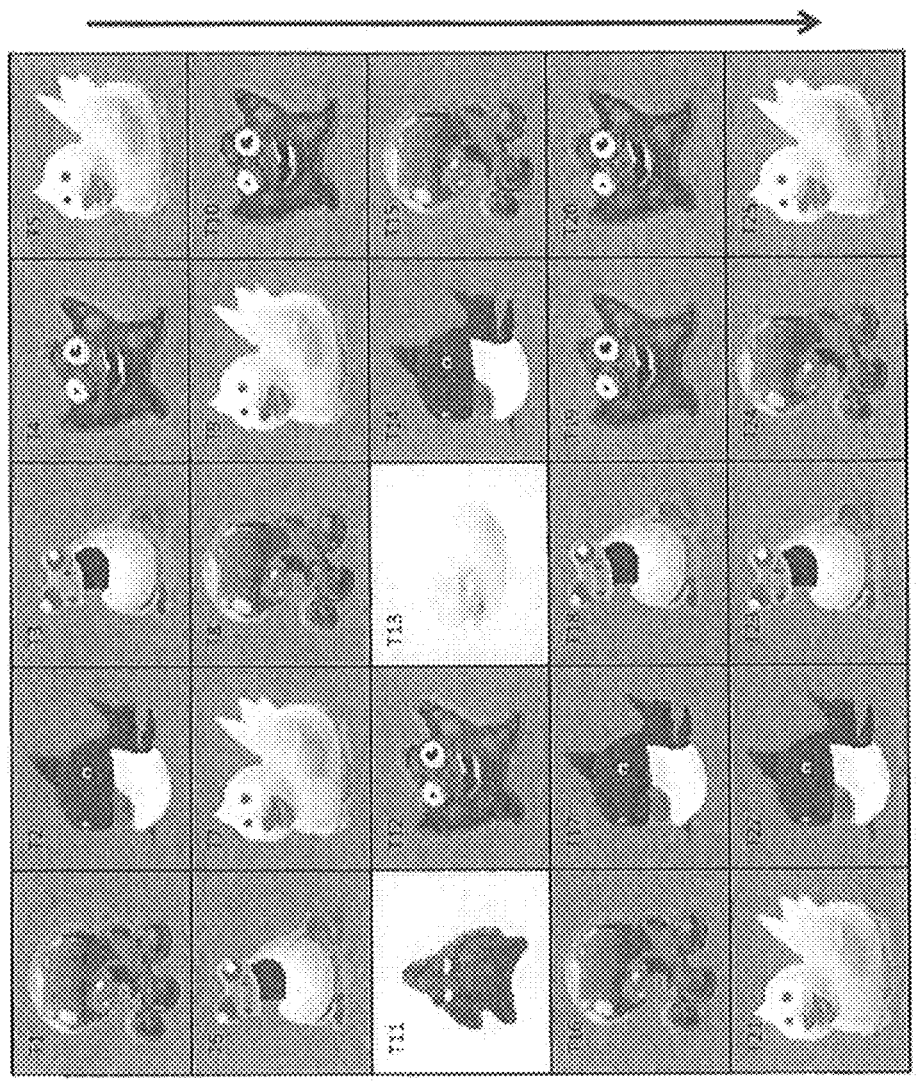

FIG. 12i shows the spaces in the game board having been refilled from above in the usual way, with the remaining game objects moving to the bottom of their respective tile columns.

Figure 13A:
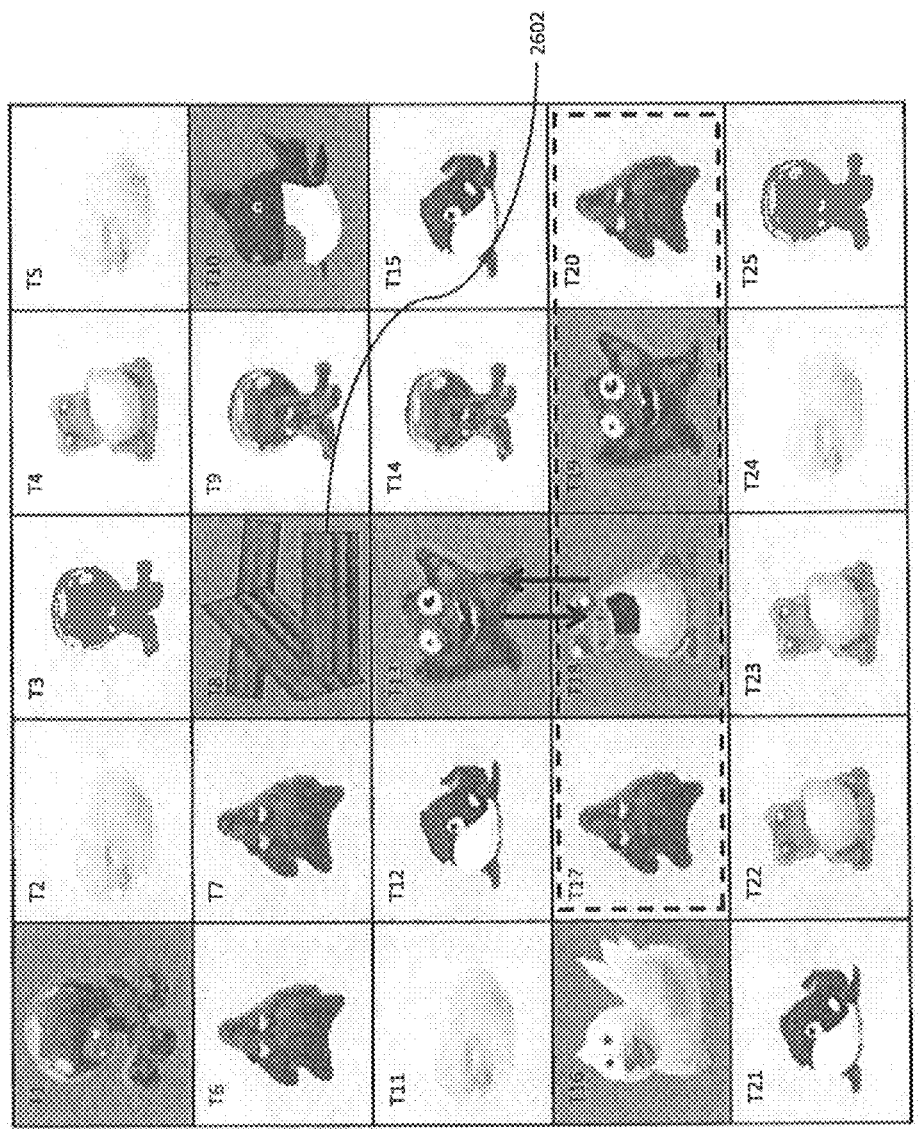
FIGS. 13(a)-(d) show an edited version of a game board, illustrating the result of a 4-combo match on tiles where at least one tile has attained a water background, and a tile adjacent to the 4-combo contains a driftwood 'blocker'.
Figure 13B:
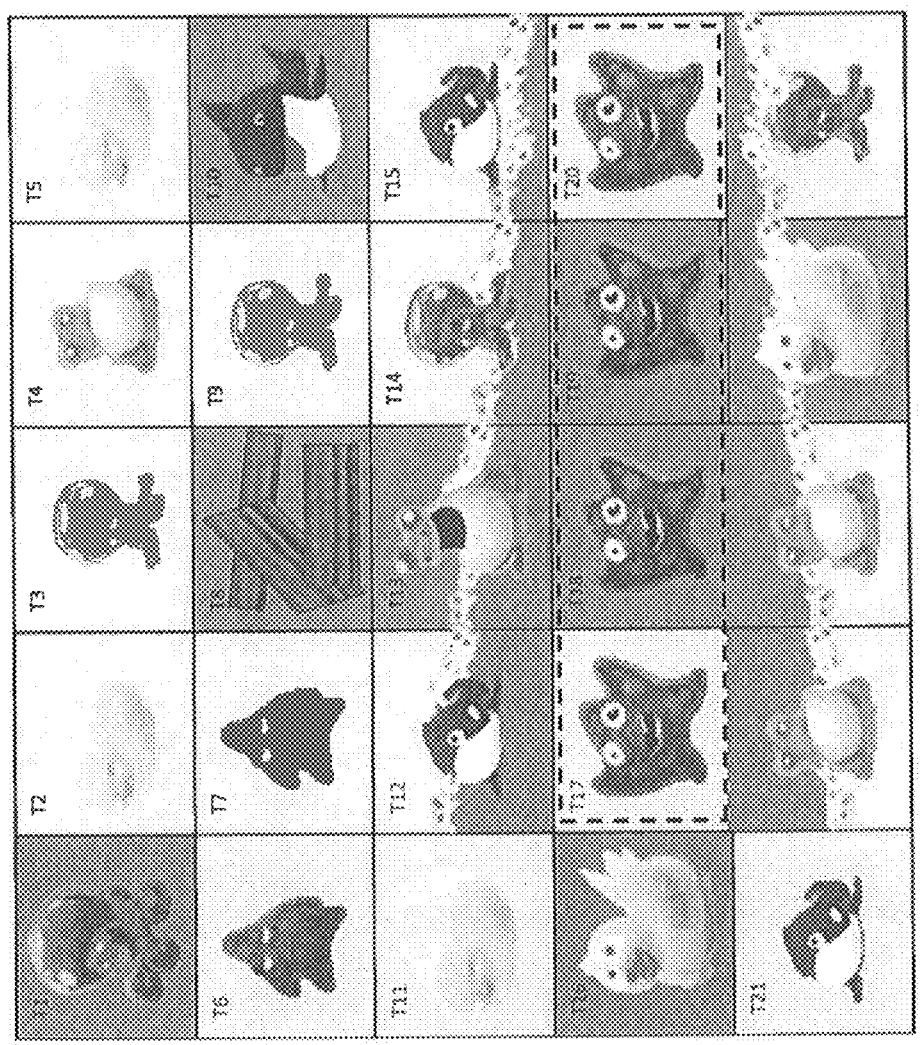

FIG. 13a shows an edited version of the game board. Tile T8 is occupied by a 'blocker' 2602, illustrated by 3 overlapping planks of driftwood. A move resulting in a 4-combo is shown by two arrows, and the resulting 4-combo position is outlined by a dashed line.

FIG. 13a shows the resulting tidal waves from the 4-combo travelling through the water tiles until they reach a ground tile, as previously described in more detail with reference to FIGS. 10 and 11.

Figure 13C:
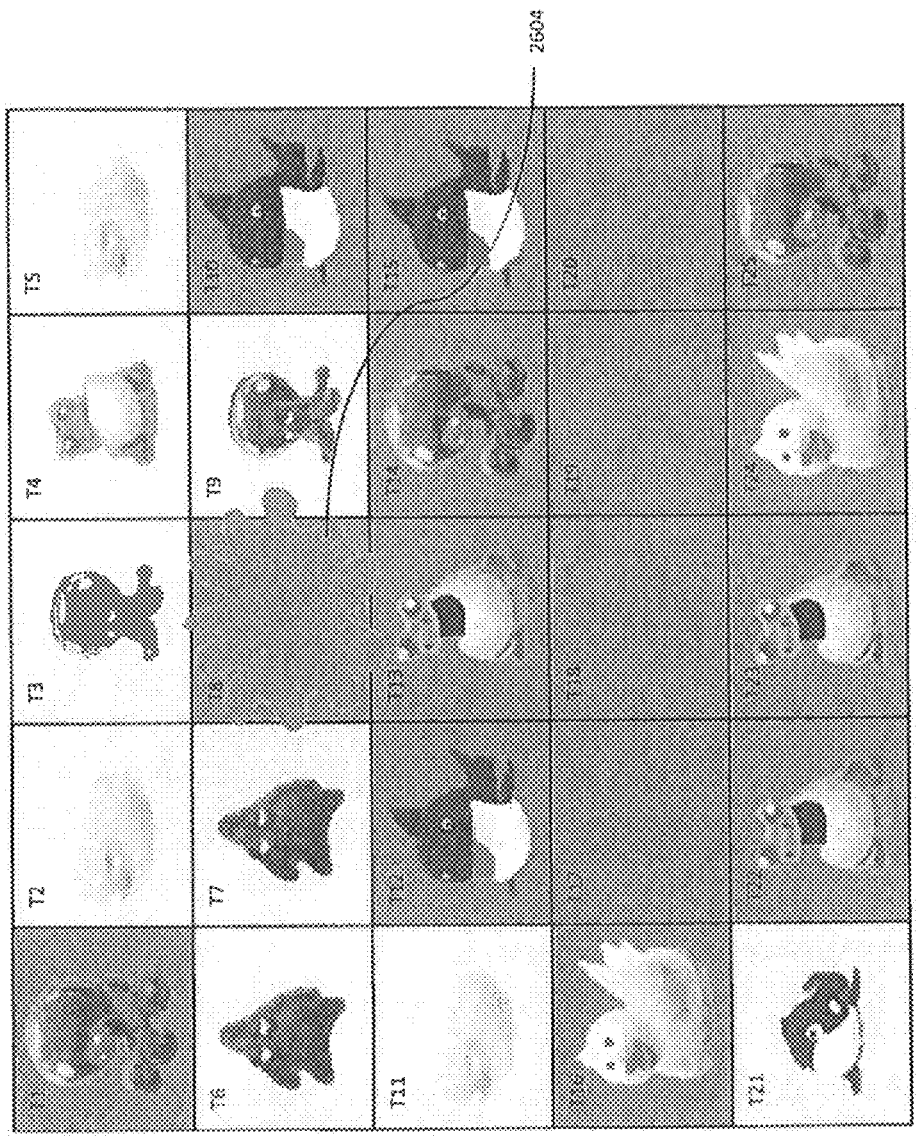

FIG. 13c shows the game board after the tidal wave has moved through tile T13, and on to tile T8. As T13 had already attained a water background, there is no change in its background or the marine animal that occupies it. Tile T8 contains a splash 2604 as a result of the tidal wave then encountering the 'blocker' 2602 occupying this tile. The 'blocker' is destroyed by the tidal wave, and the tidal wave moves no further along the column. Tile T8 attains a water background as the result of this encounter.

Figure 13D:
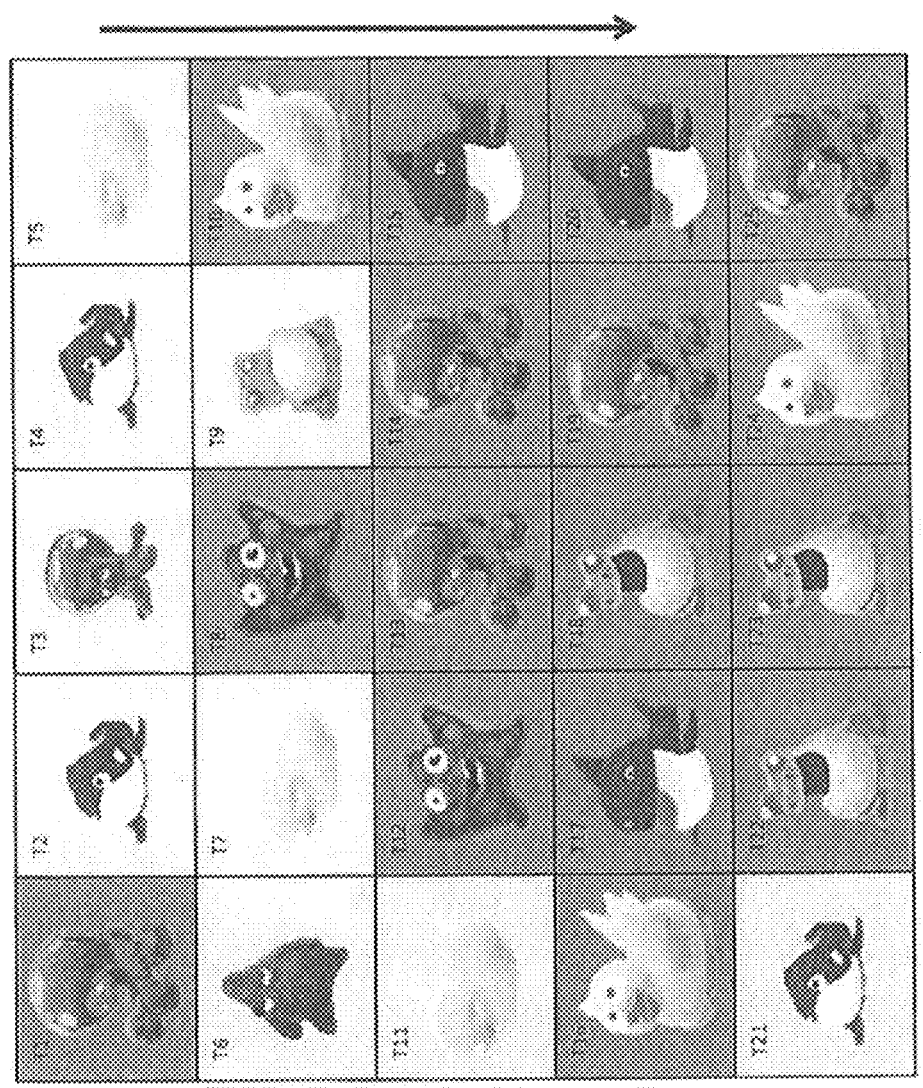

FIG. 13d shows the game board having been refilled from above, as previously illustrated, and indicated by an arrow.

FIG. 14 is a flow diagram which shows the steps to be carried out to determine the type of refill to be rendered. In this context, a refill is the process of rendering a new gameboard where the tiles are rendered in dependence on user moves in the preceding gameboard. A tile is rendered with a background appearance and a game element. Both, either or neither may change in each tile location, depending on the previous user moves. Any particular refill is dependent upon the presence of water on tiles within a match. At Step 1400 a match is detected. A check is performed returning that none of the matched buddies are on water S1402. This results in the board refilling normally S1404. Alternatively, the check returns that one or more buddies within the match are on water S1406. This results in the board refilling the match tiles with a background appearance as water and with the buddies with "happy" faces as the game elements. Then the process goes on to determine how to construct the tidal wave which will emanate in a direction different to the direction from the match. If the matching buddies are on tiles on water, S1410, then the subsequent tile in the second direction is checked S1412. If that is also on water, a loop is performed until a tile where the buddy is on sand is encountered. Steps S1412, S1414. When at Step S1414 it is determined that the next tile is on sand, the process proceeds to render this adjacent tile with a wave front visual effect, which shows that tile changing from sand to water as the wave front progresses in the second direction along the tile, Step S1416. If at Step S1410 it is determined that the adjacent tile is not already water, then the wave front appearance is generated straight away on that adjacent tile, showing it changing from sand to water. After that, the wave front goes no further. The sand tile has changed to water but blocked further progress of the "wave".

The process also detects for blocking conditions other than the sand tile. If the sand tile is the blocking condition, it is changed to water as described. However, the process also detects for a blocking condition in the form of a blocker game element S1418 and the edge of the board S1420.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the scope of the invention as claimed.

The terms user and player are used interchangeably throughout this document and no specific meaning is intended using one or the other unless the context suggests otherwise.

The invention claimed is:
1. A computer device having:
   a user interface configured to display user actuatable game elements in a game board and to detect user input when a user engages with a game element in a move;
   a processor configured to receive a detected user input and on detecting a match game condition of multiple tiles in a first direction to control the user interface to remove at least three game elements from the display and to generate replacement user game elements for a subsequent move; and
   a graphics rendering component operable to render the game elements on the user interface, each game element having a graphical representation on a tile having a background appearance,
   wherein the processor is configured to determine on detecting the match game condition if at least one tile in the match game condition has an attained background appearance and if so to apply the attained background appearance to each tile of the match condition, and further configured on detecting a match game condition of a predetermined type to extend the attained background appearance to at least one further tile adjacent each tile of the match condition in a second direction different to the first direction.

2. A computer device according to claim 1, wherein the attained background appearance is extended to at least two further tiles adjacent opposite edges of each tile of the match condition.

3. A computer device according to claim 1, wherein the tiles on the game board are arranged in rows and columns.

4. A computer device according to claim 3, wherein the processor is configured to detect the match game condition of tiles in a row, and to extend the attained background appearance to the at least one further tile in the direction of a column.

5. A computer device according to claim 4, wherein one predetermined type of a match game condition is that game elements on four sequentially adjacent tiles match.

6. A computer device according to claim 4, wherein one predetermined type of match game condition is a condition in which the game elements on at least three tiles in a first direction and at least three tiles in a second direction match, wherein one of the at least three tiles in the first direction is in common with one of the at least three tiles in the second direction.

7. A computer device according to claim 6, wherein the tiles with matching game elements form an L.

8. A computer device according to claim 6, wherein the tiles with matching game elements form a T.

9. A computer device according to claim 1, wherein a game element is engaged by a user to be switched with an adjacent game element to create a match.

10. A computer device according to claim 1, wherein the attained background appearance is indicative of water in tiles of the match condition, and wherein the attained background appearance when extended to the at least one further tile further comprises a visual effect denoting a wave front.

11. A computer device according to claim 1, wherein the attained background appearance is extended to subsequent further tiles until a blocking condition is detected.

12. A computer device according to claim 11, wherein the processor is configured to determine a blocking condition at an edge of the game board.

13. A computer device according to claim 11, wherein the processor is configured to determine a blocking condition when a tile comprising a blocker element is detected.

14. A computer device according to claim 1, wherein the graphics rendering component is operable to render at least some game elements on the user interface with a tile having a standard background appearance, wherein the standard background appearance differs visually from the attained background appearance.

15. A computer device according to claim 14, wherein the processor is configured to determine a blocking condition at a tile of a standard background appearance.

16. A computer device according to claim 1, wherein the attained background appearance is extended beyond the at least one further tile to a subsequent tile in the second direction if the at least one further tile already has the attained background appearance.

17. A computer device according to claim 1, wherein the processor is configured to render a new game board by removing the game element from the at least one further tile and generating a visual removal effect.

18. A computer implemented method of controlling a user interface responsive to user engagement with displayed game elements on an interface, the method comprising the following steps implemented by a processor of a computer device:
  detecting a match game condition of at least three game elements on tiles arranged in a first direction responsive to user input;
  generating replacement game elements to be displayed, each game element associated with a tile having a background appearance;
  determining on detecting the match game condition if at least one tile in the match game condition has an attained background appearance, and if so applying the attained background appearance to each tile of the match condition; and
  extending the attained background appearance to at least one further tile adjacent each tile of the match condition in a second direction different to the first condition.

19. A method according to claim 18, comprising removing the game element from the at least one further tile and generating a visual removal effect.

* * * * *